(12) United States Patent
Thacker et al.

(10) Patent No.: US 12,375,854 B2
(45) Date of Patent: *Jul. 29, 2025

(54) MODULAR HEADSET ASSEMBLY

(71) Applicant: Honeywell International Inc., Charlotte, NC (US)

(72) Inventors: Robert Dean Thacker, Pittsburgh, PA (US); Evan Alexander Bennis, Conshohocken, PA (US); Clare Donaher, Newtown Sq, PA (US); Robert Malinoski, Verona, PA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,070

(22) Filed: Jan. 19, 2024

(65) Prior Publication Data

US 2024/0163610 A1 May 16, 2024

Related U.S. Application Data

(63) Continuation of application No. 17/480,762, filed on Sep. 21, 2021, now Pat. No. 11,917,383.

(51) Int. Cl.
*H04R 5/033* (2006.01)
*G06F 3/16* (2006.01)
*H04R 1/10* (2006.01)

(52) U.S. Cl.
CPC ........... *H04R 5/0335* (2013.01); *G06F 3/162* (2013.01); *G06F 3/165* (2013.01); *G06F 3/167* (2013.01);

(Continued)

(58) Field of Classification Search
None
See application file for complete search history.

(56) References Cited

U.S. PATENT DOCUMENTS

| 5,117,464 A | * | 5/1992 | Jones | ................... | H04R 1/1058 |
| | | | | | 181/129 |
| 5,450,496 A | | 9/1995 | Burris et al. | | |

(Continued)

OTHER PUBLICATIONS

European search report Mailed on Feb. 14, 2023 for EP Application No. 22191833.

(Continued)

*Primary Examiner* — Walter F Briney, III
(74) *Attorney, Agent, or Firm* — Alston & Bird LLP

(57) ABSTRACT

Various embodiments are directed to a modular headset assembly comprising a headband, a detachable audio module in wired communication with a computing device via a cord coupled to the detachable audio module, the detachable audio module being detachably secured relative to the headband and comprising: a module housing; and a cord retention element disposed within an interior of the module housing and comprising an at least partially dynamic configuration relative to the module housing defined at least in part by a range of relative rotational motion between the cord retention element and the module housing, wherein the cord retention element may rotate within the module housing at least partially independently of an angular configuration of the module housing; wherein the cord is engaged with the cord retention element such that the cord retention element may rotates along the range of relative rotational motion based on forces acting on the cord.

20 Claims, 11 Drawing Sheets

(52) U.S. Cl.
CPC ......... *H04R 1/1008* (2013.01); *H04R 1/1033* (2013.01); *H04R 2499/11* (2013.01)

(56) References Cited

U.S. PATENT DOCUMENTS

| | | |
|---|---|---|
| 11,917,383 B2 * | 2/2024 | Thacker .............. B65H 75/364 |
| 2018/0063626 A1 | 3/2018 | Pong et al. |
| 2019/0132663 A1 | 5/2019 | Lu et al. |

OTHER PUBLICATIONS

Non-Final Rejection Mailed on Apr. 27, 2023 for U.S. Appl. No. 17/480,762, 11 page(s).
Notice of Allowance and Fees Due (PTOL-85) Mailed on Oct. 19, 2023 for U.S. Appl. No. 17/480,762, 5 page(s).
EP Office Action Mailed on Feb. 21, 2025 for EP Application No. 22191833, 4 page(s).

\* cited by examiner

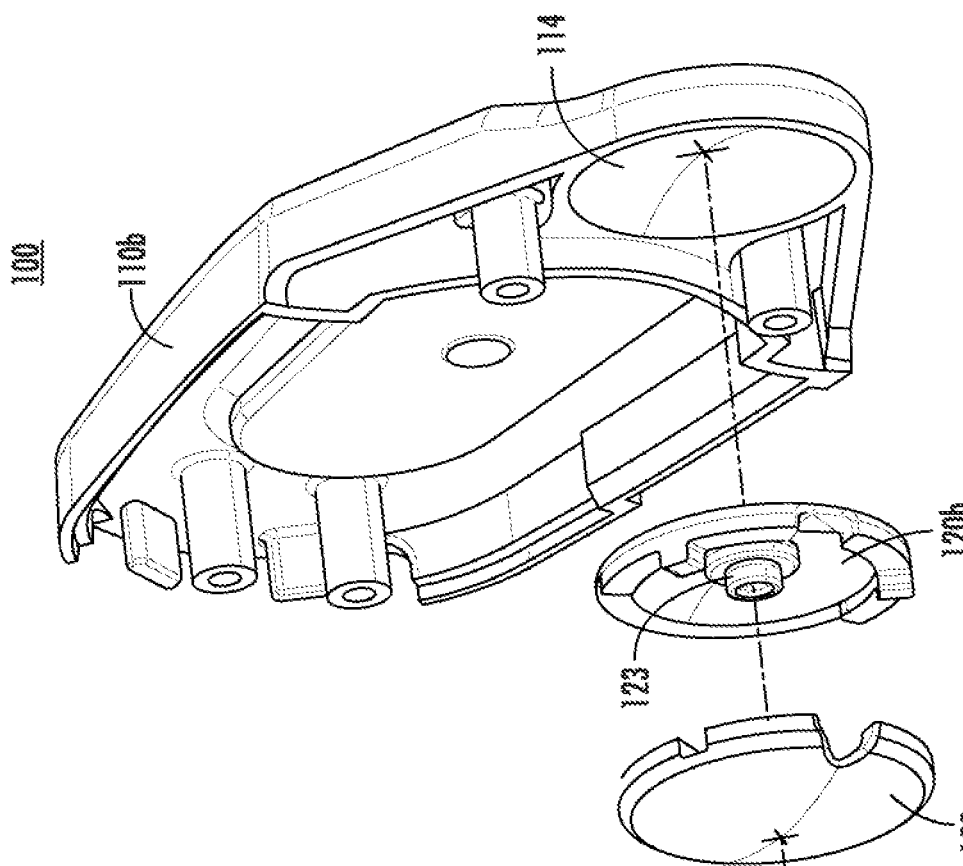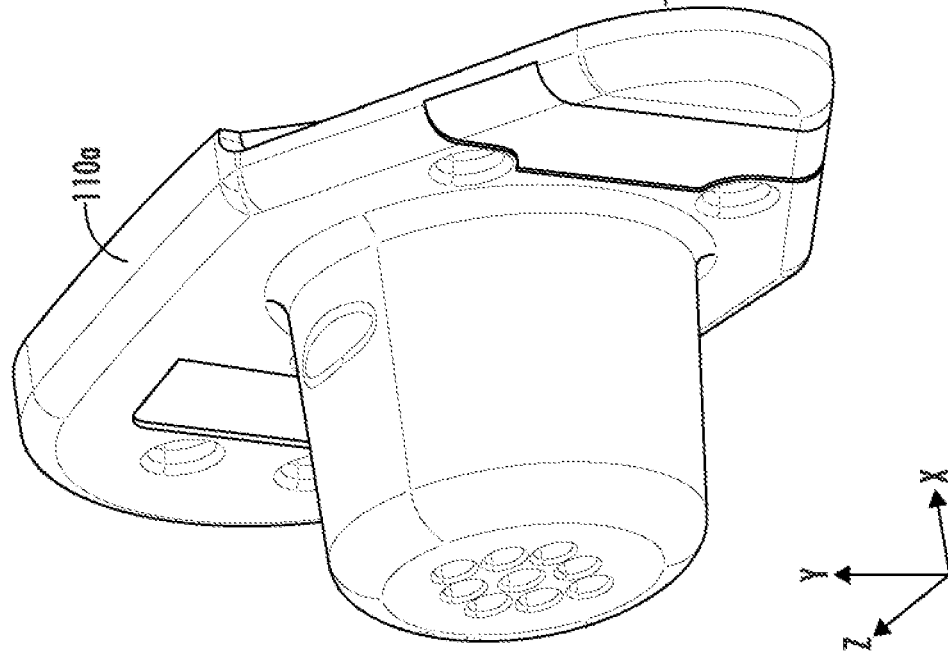
FIG. 4B

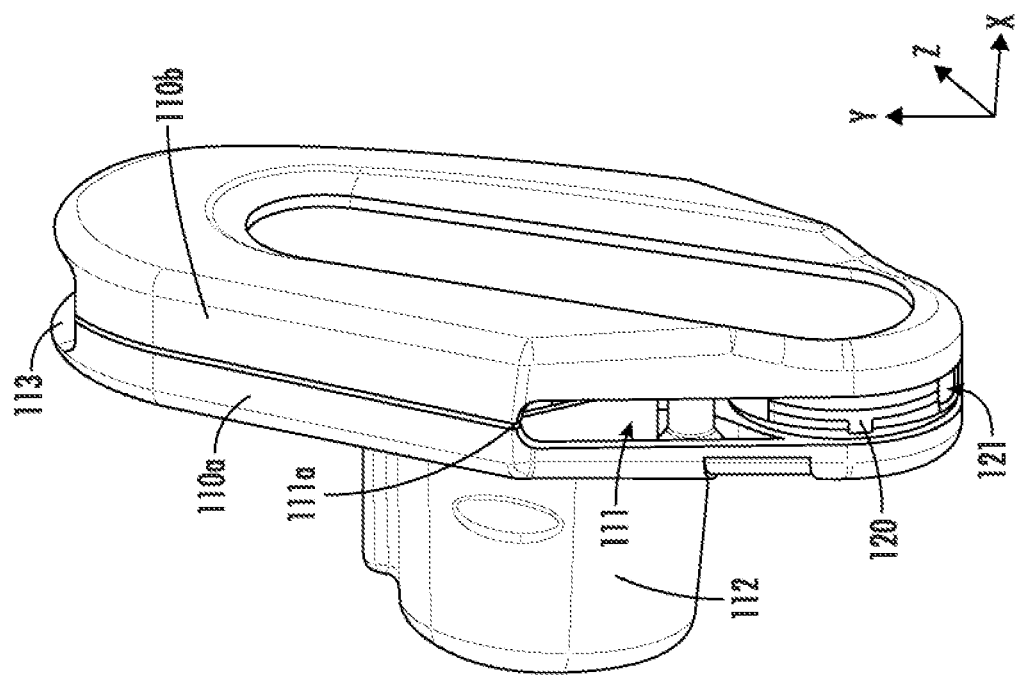
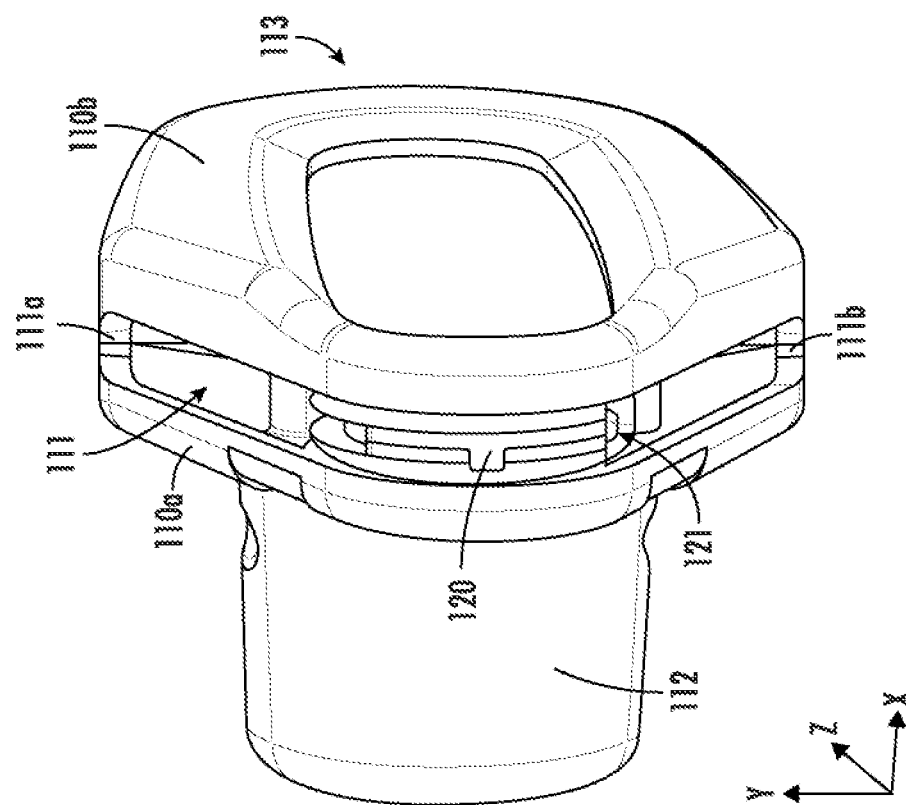

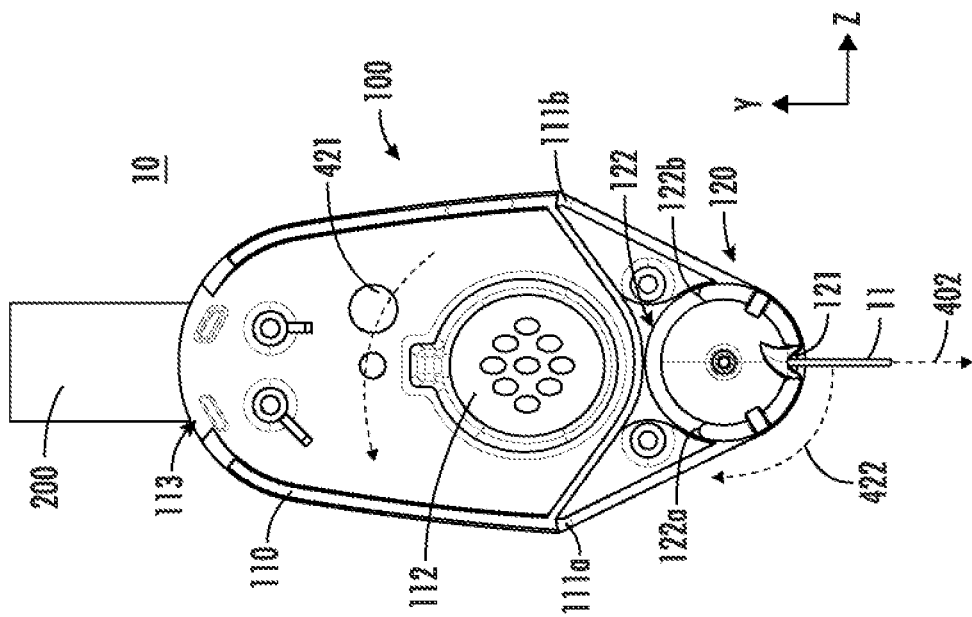
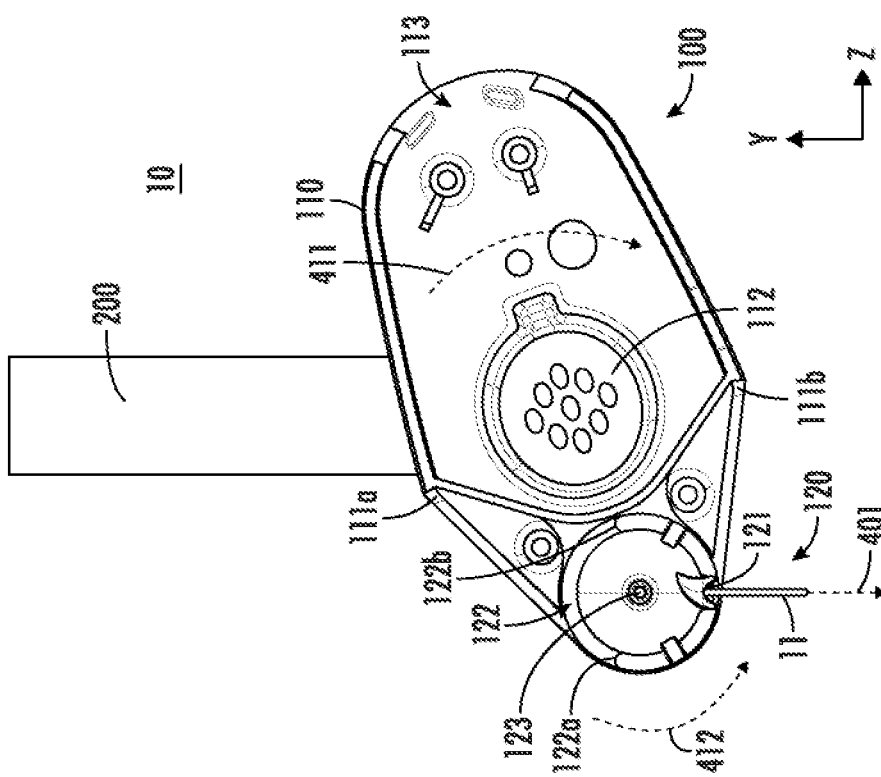

MODULAR HEADSET ASSEMBLY

CROSS REFERENCE TO RELATED APPLICATIONS

The present application is a continuation of U.S. Nonprovisional patent application Ser. No. 17/480,762, entitled "A Modular Headset Assembly," filed on Sep. 21, 2021, which is incorporated by reference herein in its entirety.

FIELD OF THE INVENTION

Various embodiments described herein relate generally to communication headsets. In particular, various embodiments are directed to communication headsets configured for wired communication with one or more devices.

BACKGROUND

Industrial and commercial applications may use wearable communication devices, such as headsets, for executing various tasks including voice commands or voice assisted tasks in working environments. In particular, a wearable headset including a headband a various communicative components may utilize a wired configuration to communicate various audio data between a computing device. Through applied effort, ingenuity, and innovation, Applicant has solved problems relating to wearable headsets by developing solutions embodied in the present disclosure, which are described in detail below.

BRIEF SUMMARY

Various embodiments are directed to a modular headset assembly and method of using the same. In various embodiments, a modular headset assembly may comprise a headband configured to be worn on the head of a user; a detachable audio module configured for electronic communication with a computing device via a wired communication defined at least in part by a cord coupled to the detachable audio module, the detachable audio module comprising: a module housing configured to house one or more communicative components within an interior portion defined therein; and a cord retention element disposed within the interior portion of the module housing and comprising an at least partially dynamic configuration relative to the module housing defined at least in part by a range of relative rotational motion between the cord retention element and the module housing, wherein the cord retention element may rotate within the module housing at least partially independently of an angular configuration of the module housing; wherein at least a portion of the cord disposed within the module housing is engaged with the cord retention element such that the cord retention element is configured to rotate along the range of relative rotational motion based at least in part on one or more forces acting on the cord; wherein the detachable audio module is configured to be detachably secured relative to at least a portion of the headband.

In various embodiments, the cord retention element may be at least partially secured within the modular housing via a ball-in-socket connection configured to secure a linear position of the cord retention element within the module housing and enable a rotational movement of the cord retention element relative to the module housing within the range of relative rotational motion. In certain embodiments, the module housing may comprise a first housing component comprising a first socket surface and a second housing component comprising a second socket surface; wherein the first housing component and the second housing component are configured to be coupled together such that the first socket surface and the second socket surface collectively define a socket configured to receive the cord retention element therein. Further, in certain embodiments, the range of relative rotational motion between the cord retention element and the module housing may be defined within a plane that extends along a length of the detachable audio module. In various embodiments, the at least a portion of the cord engaged with the cord retention element may be disposed within an internal portion of the cord retention element, and wherein the at least a portion of the cord disposed within the internal portion of the cord retention element embodies a service loop.

In various embodiments, the detachable audio module may be configured to rotate about a first central axis defined at least in part by a module interface element used to detachably secure the detachable audio module to the headband, such that the detachable audio module is selectively configurable between a plurality of angular configurations relative to the headband. In various embodiments, the cord may extend directly between a proximal end fixedly secured within the module housing and a distal end configured for coupling to the computing device. Further, in various embodiments, the detachable audio module may comprise one or more temporary fastening elements configured engage at least a portion of the cord so as to at least partially stabilize the at least a portion of the cord in a predefined position within the module housing at least substantially adjacent a cord passage orifice extending along a perimeter of the module housing.

In various embodiments, a microphone may be operatively connected to the detachable audio module. In various embodiments, the range of relative motion between the cord retention element and the module housing may be configured such that an intermediate perimeter portion of the cord extending out from within the internal portion of the module housing is maintained in an at least substantially neutral position wherein the intermediate perimeter portion extends away from the module housing in a gravitational direction based at least in part on one or more gravitational forces. In various embodiments, the range of relative rotational motion between the cord retention element and the module housing may be defined at least in part by a range of motion of an intermediate perimeter portion of the cord along a length of the cord passage orifice between a first orifice end and a second orifice end. In various embodiments, the cord retention element may comprise a cord retention element receiving orifice comprising an elongated opening extending radially along an outer perimeter of the cord retention element, and a cord retention element exit orifice comprising an at least substantially cylindrical aperture.

Various embodiments are directed to a modular headset assembly comprising: a headband configured to be worn on the head of a user; a detachable audio module in electronic communication with a computing device via a wired communication defined at least in part by a cord coupled to the detachable audio module, the detachable audio module comprising: a module housing configured to house one or more communicative components within an interior portion defined therein; and a cord retention element disposed within the interior portion of the module housing and configured to engage a portion of the cord disposed within the module housing, wherein the cord retention element is configured to facilitate a dynamic configuration of the portion of the cord relative to the module housing such that an intermediate perimeter portion of the cord extending out from within the module housing may define an angular configuration relative to a gravitational direction that is at least partially independent of an arrangement of the modular housing relative to the gravitational direction; wherein the detachable audio module is configured to be detachably secured relative to at least a portion of the headband.

In various embodiments, the detachable audio module may comprise one or more temporary fastening elements configured engage at least a portion of the cord so as to at least partially stabilize the at least a portion of the cord in a predefined position within the module housing at least substantially adjacent a cord passage orifice extending along a perimeter of the module housing. In certain embodiments, the one or more temporary fastening elements may comprise: a first temporary fastening element positioned within the internal portion of the modular housing at least substantially adjacent a first orifice end of the cord passage orifice; and a second temporary fastening element positioned within the internal portion of the modular housing at least substantially adjacent a second orifice end of the cord passage orifice; wherein the first orifice end and the second orifice end comprise opposing ends of the cord passage orifice with a length of the cord passage orifice extending therebetween. Further, in certain embodiments, the one or more fastener elements may comprise a magnet, and the cord may comprise an at least partially magnetic section positioned along a length of the cord, wherein the at least partially magnetic section of the cord is configured to at least temporarily engage the magnet based at least in part on the dynamic configuration of the portion of the cord disposed within the module housing.

In various embodiments, the module housing may comprise a first housing component comprising a first socket surface and a second housing component comprising a second socket surface; wherein the first housing component and the second housing component are configured to be coupled together such that the first socket surface and the second socket surface collectively define a socket configured to receive the cord retention element therein. In various embodiments, the cord may extend directly between a proximal end fixedly secured within the module housing and a distal end configured for coupling to the computing device. In various embodiments, the detachable audio module may be configured to rotate about a first central axis defined at least in part by a module interface element used to detachably secure the detachable audio module to the headband, such that the detachable audio module is selectively configurable between a plurality of angular configurations relative to the headband. In various embodiments, the cord retention element may comprise a plurality of curved surfaces arranged within the internal portion of the module housing and extending at least partially between a cord retention element exit orifice and an orifice end of the cord passage orifice extending along a perimeter of the module housing.

BRIEF DESCRIPTION OF THE DRAWINGS

Reference will now be made to the accompanying drawings, which are not necessarily drawn to scale, and wherein:

FIGS. 4A-4B illustrate various exploded views of an exemplary modular headset assembly in accordance with various embodiments;

FIGS. 6A-6B illustrate various perspective views of an exemplary modular headset assembly in accordance with various embodiments;

FIGS. 7A-7B illustrate various cross-sectional views of an exemplary modular headset assembly in accordance with various embodiments;

DETAILED DESCRIPTION

Figure 1:
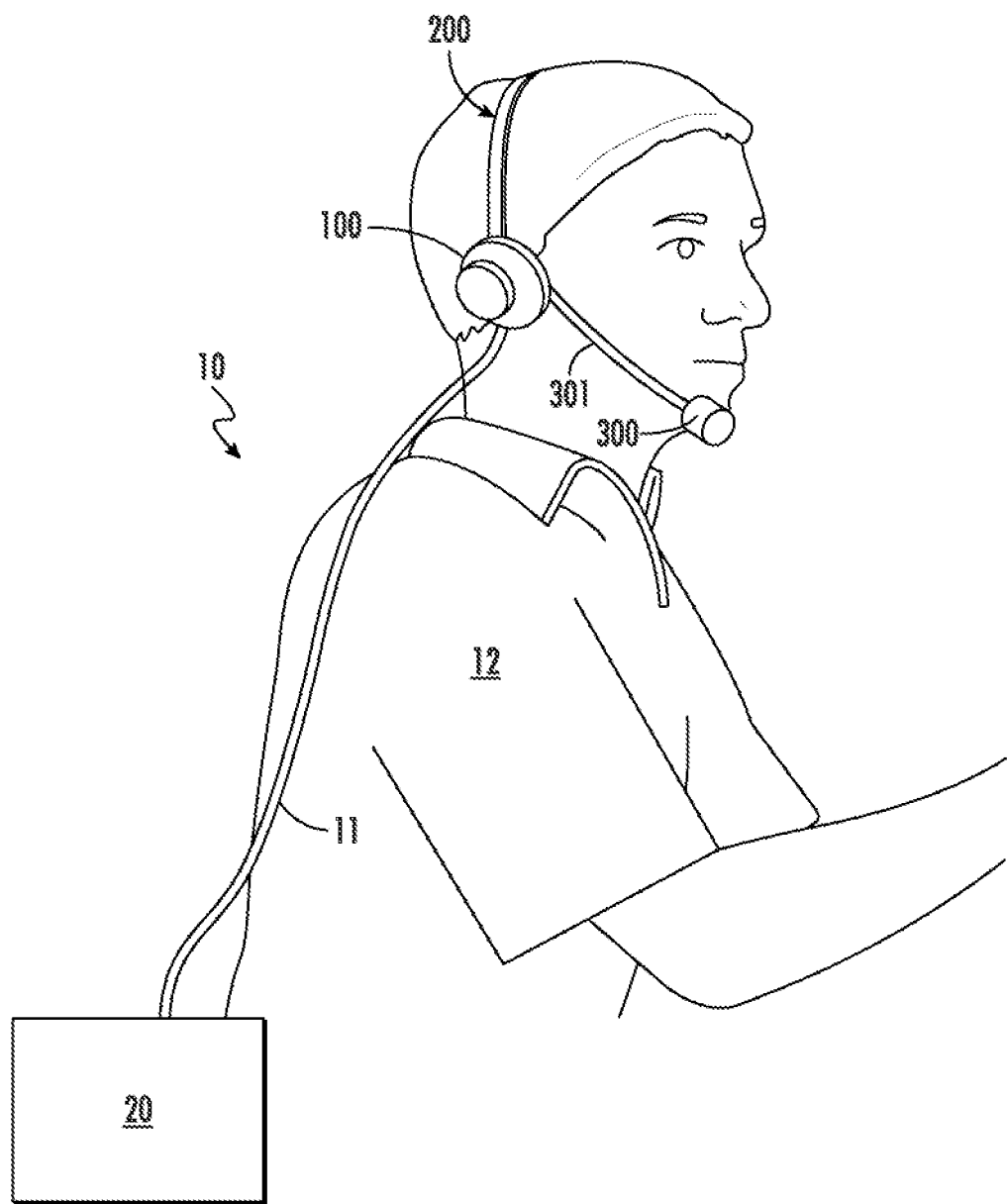
FIG. 1 illustrates a perspective view of a user with an exemplary modular headset assembly in accordance with an embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

As used herein, directional terms used to describe a component, configuration, action, position, direction, and/or the like (e.g., "downwardly," "an upward vertical direction," "horizontal," and the like) are meant to be interpreted relative to a hypothetical modular headset assembly being worn on the head of a user, wherein the user is standing in an upright position looking in a substantially forward direction (e.g., in the positive z-direction, as shown) along a horizontal plane (e.g., the z-x plane, as shown) towards a horizon.

Various wearable communication devices, such as, for example, wearable headsets, are used to facilitate electronic communication of audio signals between a user wearing the wearable headset and a computing device. Various wearable headsets may utilize a wired configuration to enable the transmission of audio signals between the headset and the computing device in communication therewith. For example, wearable headsets may utilize a wired configuration defined at least in part by an electronic cord extending between the headset and the computing device. For example, such a wearable headset may include a headband configured to engage the head of a user and at least one earphone attached to an end portion of the headband so as to be positioned adjacent the ear of a user wearing the headset. The headset may comprise a unitary product defined by a plurality of components assemble in a rigid configuration so as to be at least substantially permanently attached to one another. Further, the cord defining the wired configuration of the headset by extending between the unitary headset and a computing device may be attached to the headset via a connection to and/or integration within the headband and/or one or more of the earphones fixedly coupled thereto. To facilitate effective communication using the wearable headset, various headsets may be configured such that the earphone component (e.g., a microphone extending therefrom) may be rotated relative to the headband attached thereto between an active position wherein the earphone is rotated such that a microphone is positioned adjacent the mouth of a user—and a resting position—wherein the earphone is rotated such that a microphone is positioned away from the mouth of a user. As a headset utilizing a wired configuration is reconfigured between various orientations and angular configurations, a mechanical strain may be generated along at least a portion of the cord extending between a rigid connection at the headset and a computing device, which may result in intermittent product operability, a decreased lifespan of the headset, and/or total product failure.

Further, headbands utilized in wearable headsets may be defined by relatively low production cost compared to the headset's earphone component, which may contain the various electronics (e.g., microphones, speaker elements, and/or the like) utilized by the headset during communication. Further, where a headband of a wearable headset may be configured to directly engage the body (e.g., the head) of a wearer, the headband may be more prone to exhibiting various unsanitary conditions, or requiring one or more sanitation operations to at least partially sanitize the headband prior to a subsequent use by a second wearer.

The present disclosure relates generally to wearable headset assemblies having a wired configuration and comprising a modular configuration defined by a detachable audio module that is configured to be removably secured to a headband. In various embodiments, the modular configuration of the modular headset assembly described herein may be facilitated at least in part by a configuration wherein the cord defining the wired configuration of the headset is coupled directly to the detachable audio assembly, such as, for example, within an internal portion of the module housing thereof. Modular headset assemblies as described herein are particularly preferred when compared to unitary wired headsets that are limited to a rigid configuration wherein an audio module (e.g., an earphone) is fixedly secured to the headband worn by the user.

In various embodiments, the present invention described herein may further include a modular headset assembly comprising a detachable audio module that includes a cord retention element configured to engage at least a portion of a cord disposed within the module housing and comprising an at least partially dynamic configuration relative to the module housing such that that the cord retention element may rotate along a range of relative rotational motion defined between the cord retention element and the module housing, such that a portion of a cord extending from the module housing via the cord retention element may extend towards a computing entity in a direction that is at least substantially unaffected by the angular configuration of the module housing.

The modular configuration of the present invention corresponds to a reduction in production costs and part costs resulting from the ability of a single detachable audio module to be detached from a user-specific headband and shared amongst a plurality of different users in subsequent uses. Further, the modular configuration of the present invention alleviates the hygienic obstacles presented in circumstances wherein a wearable headset is shared amongst multiple users for subsequent uses. In addition, various embodiments of the present invention are configured to alleviate mechanical strain realized within a cord attached to an audio module of a wired headset as the audio module is moved, reoriented, and reconfigured through a plurality of different positional configurations. The dynamic configuration of the cord retention element relative to the modular housing s described herein facilitates a modular headset assembly wherein the mechanical strain realized at a connection point between the cord and the modular headset assembly is at least substantially minimized by enabling independent rotational motion of the cord relative to the module housing so as to eliminate at least a portion of the strain forces acting on the cord and/or the modular headset assembly.

FIG. 1 illustrates a perspective view of a user with an exemplary modular headset assembly in accordance with an embodiment described herein. In particular, FIG. 1 illustrates an example modular headset assembly 10 being worn by a user 12, the modular headset assembly 10 comprising a detachable audio module 100, a headband 200, a microphone 300, a microphone boom 301, and a cord 11 configured operatively connect the modular headset assembly 10 to a computing device 20 so as to facilitate electronic communication therebetween.

In various embodiments, the modular headset assembly 10, as shown in FIG. 1, may provide voice communication assistance to a user 12 wearing the modular headset assembly 10. For example, a user 12 wearing the modular headset assembly 10 may receive one or more audio signals transmitted from a computing device 20 to the detachable audio module 100 via the cord 11. Further, the user 12 wearing the modular headset assembly 10 may provide one or more speech inputs through the modular headset assembly 10 via the microphone 300.

With continued reference to FIG. 1, the modular headset assembly 10 may include a microphone 300 for receiving speech signal inputs from a user 12. The speech signal inputs may be received in the form of an utterance by a user 12. For example, the user 12 may provide various speech inputs to the microphone 300 in response to voice assisted commands received over the headset. By way of example, in a workflow environment an operator wearing the modular headset assembly 10 at a workstation (not shown) such that the modular headset assembly 10 is directly connected to a computing device 20 via a wired connected (e.g., cord 12) the user may receive voice commands and/or informational communications received on the modular headset assembly 10 (e.g., via the detachable audio module 100) from a remote control room and/or secondary user in a remote location with access to a corresponding device in communication with the computing device 20. Accordingly, in response to and/or in anticipation of the communications received by the user 12, the user 12 may provide speech inputs to the microphone 300.

The modular headset assembly 10 may further include a headband 200 for securing the modular headset assembly 10 (e.g., the detachable audio module 110) relative to the head of a user 12. The headband 200 may include a curved portion worn over the head of a user, as shown in FIG. 1. According to various embodiments described herein, the headband 200 may be of any shape or design and may be adjustable, such that different users may adjust the headband 200 as desired. The curved portion may connect to an earphone at one end, and/or connect to two earphones at both ends of the curved portion (not shown). For example, in various embodiments, the headset 200 may be configured such that the detachable audio module 100 may be removably coupled to one end of the curved portion of the headset 200. In such an exemplary circumstance, the headset 200 may be configured to secure the detachable audio module 100 in a position at least substantially adjacent an ear of the user 12 wearing the headset 200. For example, the detachable audio module 100 may be operable as an earphone such that, when secured to headset 200 being worn by a user 12, the such that the detachable audio module 100 is configured to transmit audio signals, such as, voice commands and/or informational communications received from a computing device 20, to the user 12.

In various embodiments, an exemplary modular headset assembly 10 may comprise a modular configuration defined at least in part by a detachable audio module 100 configured to be detachably secured relative to at least a portion of the headband 200. As described herein, the module housing 108 of the detachable audio module 100 may be removably coupled to an end of the curved portion of the headband 200 such that the detachable audio module 100 may be secured in a position at least substantially adjacent an ear of the user 12 wearing the headset 200 and the detachable audio module 100 may be utilized to facilitate transmission of various audio signals to and/or from the user 12. For example, the module housing 110 may comprise an exterior shell defining an interior portion therein. In various embodiments, the module housing may be configured to engage and/or be engaged by the headset 200 so as to facilitate the at least substantially non-permanent coupling of the detachable audio module 100 to the headset 200 and, further, may house (e.g., within an interior portion) one or more communicative components for enabling a user 12 wearing the headset 200 to receive and/or transmit voice data when the detachable audio module 100 is secured to the headset 200. For example, the detachable audio module 100 may be configured to house communicative components (e.g., circuitries) for enabling a user 12 to receive and/or transmit voice data, including but not limited to, one or more speakers, drivers, digital to analog converter (DAC), noise cancellation circuitry, and the like. Further, in various embodiments, the detachable audio module 100 may be in electronic communication with a computing device 20 via a wired communication defined at least in part by a cord 11 coupled to the detachable audio module 100. As shown, at least a portion of the cord 11 may be received with in the module housing. In various embodiments, a proximal end of the cord 11 may be fixedly coupled to one or more communicative circuitries stored within the detachable audio module 110, such that the cord 11 may be operatively detached from the headband 200 and/or an earphone element fixedly secured thereto based at least in part on the detachable audio module 100 being detached from the headband 200. For example, as described in further detail herein, the detachable audio module 100 may further comprise a cord retention element stored within the module housing that may be configured to receive at least a portion of the cord 11 therein. In various embodiments, the cord retention element of the detachable audio module 100 may comprise an at least partially dynamic configuration relative to the module housing such that the cord 11 extending from the module housing (e.g., via the cord retention element) and towards the computing device 20, based at least in part on one or more gravitational forces, may extend away from the module housing in an at least substantially vertical direction independent of an angular configuration of the module housing.

The microphone 300 may be attached to a detachable audio module 100 through a microphone boom 301 extending from a module housing 110 of the detachable audio module 100. The microphone 300 may be formed as an integral part of the microphone boom 301, or, in some embodiments, may be removably attached at a distal end (e.g., a free end) of the microphone boom 301. A proximal end (e.g., an opposing end) of the microphone boom 301 may be movably attached to the module housing 110. For example, the microphone boom 301 may be attached with a swivel or a pivot joint such that the microphone boom 301 may anchored at a point, axis, and/or the like within the module housing and rotated upwards or downwards relative to the housing (e.g., within a y-z plane, as shown, extending along the length and perpendicular to the width of the detachable audio module 100. Thus, according to various aspects described above, the orientation and/or length of the microphone boom 301 may be adjustable to position the microphone 300 at an active position (e.g., an ideal position) near the mouth of the user. Further, in various embodiments, the microphone boom 301 and/or the entire detachable audio module 100 may be configurable between a resting position (e.g., positioned such that speech signals are not received by the microphone 300) and an active position (e.g., positioned such that speech signals are received by the microphone 300). For example, in various embodiments, as described in further detail herein, the detachable audio module 100 may be configured in an active position such that the user 12 wearing the modular headset assembly 10 may both receive and transmit audio signals to and from the computing device 20, wherein the active position is defined by the detachable audio module 100 being arranged in an at least substantially horizontal configuration relative to a vertical arm of a headband 200 connected thereto and/or, in a direction extending from an ear towards the mouth of a user 12. In such an exemplary configuration, as described in further detail herein, the detachable audio module 100 may be configured in a resting position such that the user 12 wearing the modular headset assembly 10 may receive audio signals without signals being transmitted to the computing device 20, wherein the active position is defined by the detachable audio module 100 being arranged in an at least substantially vertical configuration relative to a vertical arm of a headband 200 connected thereto and/or, in a direction that does not extend directly towards the mouth of a user 12.

In some embodiments, the module housing may include a sensor (not shown) for determining a position of the microphone 300 relative to a user 12. The sensor may measure an angle and/or an arc of the microphone 300, the microphone boom 301, or any combination thereof. Further, the sensor may determine a position of the microphone 300 in any units of measurement such as degrees or radians. The sensor may be any positional sensor including but not limited to, a radial positional sensor, a gyroscope, an accelerometer, or the like.

Although FIG. 1 illustrates a modular headset assembly 10 with a single microphone 300 and headband 200, any style or design of headset may be used for implementing the various embodiments described herein. For example, the modular headset assembly 10 may include headbands, neckbands, ear hooks, straps, or any combination thereof. Further, the modular headset assembly 10 may include a detachable audio module 100 configured to be coupled to a first end of the headband 200 so as to be positioned adjacent a first ear of user 12, and further, may include an additional earphone secured to the second end of the headband 200 positioned adjacent a second ear of the user 12. Illustratively, in accordance with various example embodiments described herein, the earphone may be over-the-ear headphones, in-ear headphones, or any combination thereof. Further, although described in reference to a headset, the present disclosure contemplates that the embodiments described herein are not limited to a headset and may be used in any product with an adjustable microphone (e.g., a hard hat, mask, visor, helmet, or the like).

As described above, the modular headset assembly 10 may be operatively connected to a computing device 200. The modular headset assembly 10 may utilize the cord 11 to facilitate a wired communication between the detachable audio module 100 and the computing device 20. The computing device 20 may be, as described hereinafter, configured to calculate a feedback parameter based on the speech signal input received by the microphone 300. In some embodiments, the computing device 200 may be a portable computing device carried by a user 12 wearing the modular headset assembly 10. For example, the computing device 20 may be a mobile device such as a personal digital assistant (PDA), smartphone, encoded information reading terminal, or the like. In some other embodiments, the computing device 20 may be a fixed computing device such as a host computer communicating with the modular headset assembly 10 to facilitate communication between the user 12 and a secondary user, device, and/or the like (e.g., a secondary user in an at least substantially remote location).

Figure 2A:
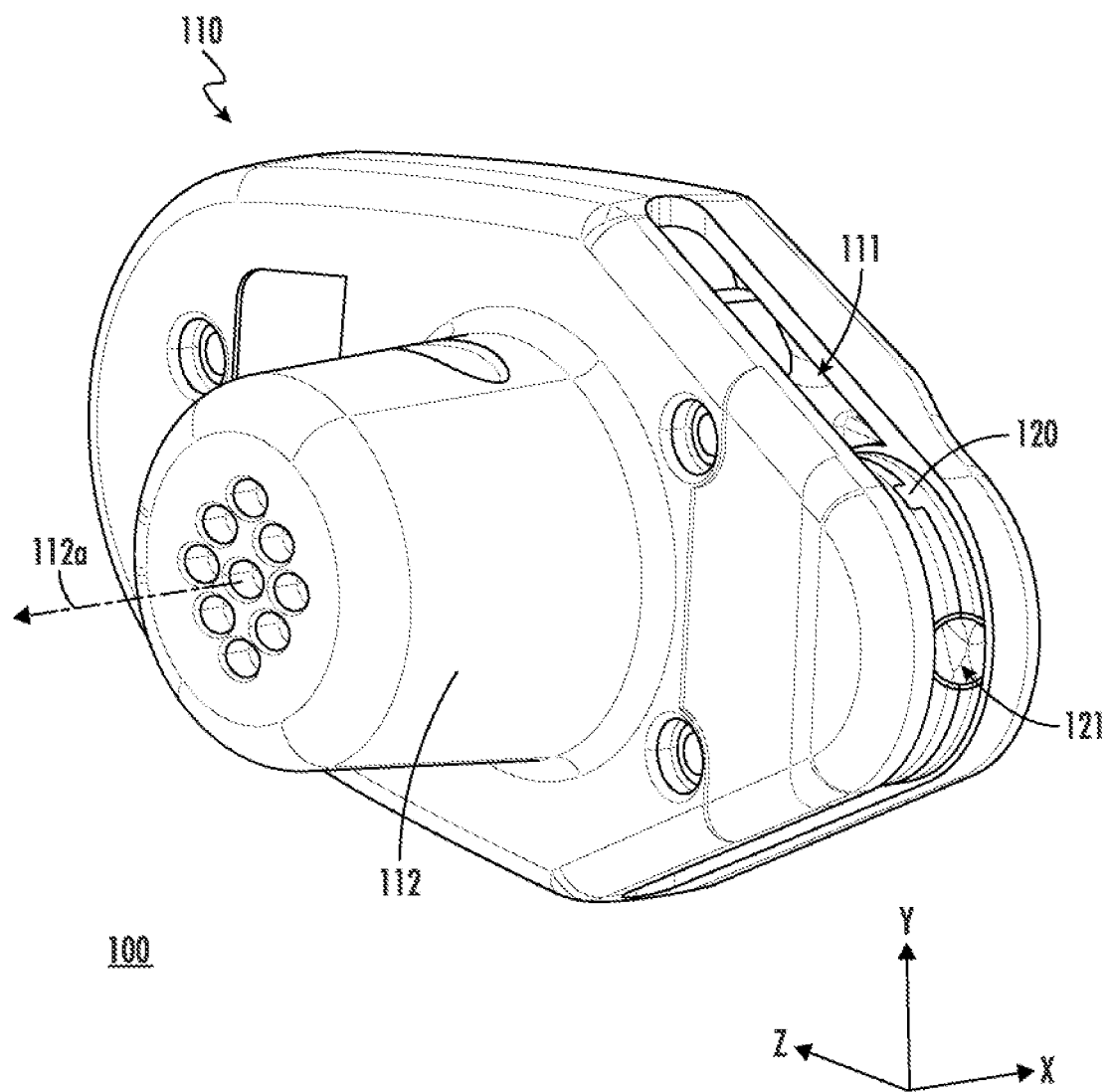
FIGS. 2A-2B illustrate various perspective views of an exemplary modular headset assembly in accordance with various embodiments.
Figure 2B:
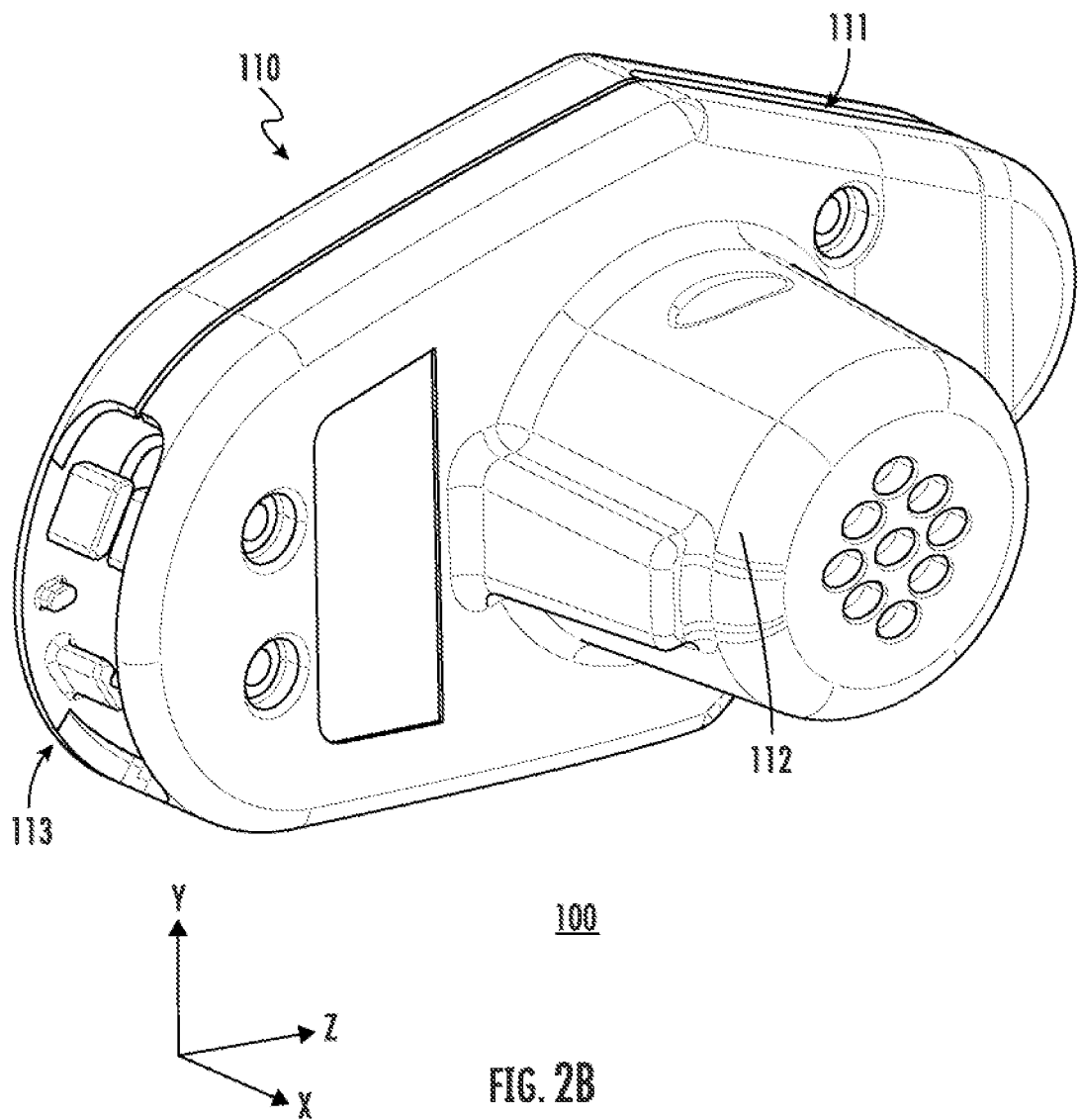

FIGS. 2A-2B illustrate various perspective views of an exemplary modular headset assembly in accordance with various embodiments. In particular, FIGS. 2A and 2B illustrate an exemplary detachable audio module 100 comprising a module housing 110 configured to house one or more communicative components for enabling communication (e.g., transmission and/or receipt) of audio signals between an exemplary modular headset assembly and one or more external devices, and a cord retention element 120 disposed therein. As illustrated, an exemplary module housing 110 may embody an exterior shell comprising one or more sidewalls configured to define an interior portion therein within which the one or more communicative components of the detachable audio module 100 may be housed. As described herein, wherein the modular headset assembly 10 is configured to facilitate transmission of audio signals via a wired configuration, the module housing 110 of the detachable audio module 100 may be configured to receive at least a portion of a cord defining the wired configuration. As a non-limiting example, wherein the modular headset assembly 10 comprises a wired configuration, a cord may extend from a first end rigidly coupled to at least a portion of the communicative components disposed within the module housing 110 to a second end coupled to a computing device, so as to facilitate the transmission of audio signals between the communicative components disposed within the detachable audio module 100 and the computing device, as described herein.

In various embodiments, the module housing 110 of the detachable audio module 100 may comprise a module interface element 112 positioned along an exterior of the module housing 110 and configured to facilitate the detachable configuration of the detachable audio module 100 wherein the detachable audio module 100 may be removably coupled to a headband, as described herein. For example, the module interface element 112 may be configured to interface an end portion of an exemplary headband such that the detachable audio module 100 may be removably secured to the headband via the interface between the headband and the module interface element 112. As illustrated, in various embodiments, the module interface element 112 may comprise a protrusion extending in an outward direction away from an exterior of the module housing 110 and configured such that a headband (e.g., an end portion) may receive and/or engage the module interface element 112 so as to at least temporarily secure the detachable audio module 100 relative to the headband in one or more directions. For example, the module interface element 112 may comprise an at least substantially rounded protrusion centered about a central axis 112a. In such an exemplary circumstance, the module interface element 112 may be configured such that when the detachable audio module 100 is coupled to a headband via the module interface element 112, the detachable audio module 100 may comprise a hinged configuration, wherein the detachable audio module 100 (e.g., the module housing 110) may be rotated relative to the headband about a hinge axis defined by the central axis 112a of the module interface element 112. For example, as described in further detail herein, the module housing 110 may be rotated relative to the headband about the central axis 112a between an active position and a resting position.

In various embodiments, an exemplary modular headset assembly may comprise a wired configuration defined at least in part by a cord that extends between the detachable audio module 100 and an exemplary computing device, as described herein. In such an exemplary circumstance, the cord defining the wired configuration of the modular headset assembly may be operatively coupled at one end to at least a portion of the communicative components disposed within the module housing 110 of the detachable audio module 100, such that at least a portion of the cord is received by the detachable audio module 100 within an internal portion of the module housing 110.

In various embodiments, the module housing 110 may comprise a cord passage orifice 111 arranged so as to extend through the module housing 110 and configured such that a cord may be received by the module housing through the cord passage orifice 111. As illustrated in FIG. 2A, the cord passage orifice 111 may comprise an elongated opening (e.g., slot) defined at least in part by a length that extends about at least a portion of a perimeter sidewall of the module housing 110. For example, in an exemplary circumstance wherein a first end of a cord (e.g., a proximal end) is operatively connected to one or more communicative components disposed within the module housing 110, the cord may extend outward from the module housing 110 (e.g., to a distal end of the cord configured to be coupled to a computing device) through the through the cord passage orifice 111. As described herein, the portion of a cord extending away from the module housing 110 at least substantially adjacent the cord passage orifice 111 (e.g., extending through the cord retention element exit orifice 121) may be described herein as the intermediate perimeter portion of the cord.

As described herein, the detachable audio module 100 may be configured such that the location along the length of the through the cord passage orifice 111 at which the cord exits the module housing 110 may vary based at least in part on the angular configuration of the module housing 110 relative to the headband (e.g., whether the detachable audio module 100 is configured in an active position, a resting position, and/or any angular configuration defined therebetween). In various embodiments, the length of the cord passage orifice 111 may extend within a plane (e.g., an at least substantially vertical plane) that is at least substantially parallel, aligned, coplanar, and/or the like, with the plane in which the rotational range of motion of the module housing 110 (e.g., between an active position and a resting position) is defined.

In various embodiments, the detachable audio module 100 may further comprise a cord retention element 120 disposed within the module housing 110. The cord retention element 120 may be configured to receive at least a portion of a cord disposed within the module housing 110. For example, at least a portion of a cord secured at a proximal end to the one or more communicative components within the module housing 110 and extending therefrom out of the detachable audio module 100 via the cord passage orifice 111 defined within a perimeter sidewall of the module housing 110 may be disposed within the cord retention element 120. In various embodiments, the cord retention element 120 of the detachable audio module 100 may be disposed within an internal portion of the module housing 110 such that at least a portion of the cord retention element is at least substantially adjacent the cord passage orifice 111. For example, the cord retention element 120 may comprise a cord retention element exit orifice disposed about a perimeter of the cord retention element 120 and configured such that the cord extending through the cord retention element 120 may exit the cord retention element 120 by passing through the cord retention element exit orifice 121. As illustrated, the cord retention element 120 may be disposed within the module housing 110 such that the cord retention element exit orifice 121 thereof is at least substantially adjacent a portion of the length of the cord passage orifice 111 of the module housing 110. For example, the portion of the cord disposed within the cord retention element 120 and extending through the cord retention element exit orifice may extend from the cord retention element exit orifice through the cord passage orifice 111 of the module housing 110 in an outward direction that is at least substantially parallel with the central axis of the cord retention element exit orifice 121. As such, the cord retention element 120 may be positioned relative to the cord passage orifice 111 such that the angular configuration of the intermediate perimeter portion of the cord (e.g., the portion of a cord extending away from the module housing 110 immediately adjacent the cord passage orifice 111) relative to the module housing 110 as it extends away from the module housing 110 through the cord passage orifice 111 may be based at least in part on the angular configuration of the cord retention element 120 (e.g., the cord retention element exit orifice 121) relative to the module housing 110.

In various embodiments, for example, the cord retention element 120 may comprise an at least partially dynamic configuration relative to the module housing 110, wherein the cord retention element 120 may move (e.g., rotate) within the module housing 110 so as to define a range of relative motion (e.g., in a radial direction) relative to the module housing 110. In such an exemplary configuration, the cord retention element 120 may be configured such that as the cord retention element 120 moves (e.g., rotates) relative to the module housing 110, the corresponding movement of the 121 may cause a portion of a cord extending through the cord retention element exit orifice 121 to be moved along the length of the cord passage orifice 111. As such, the dynamic configuration of the cord retention element 120 within the module housing 110, as described in further detail herein, may enable a detachable audio module 100 configuration wherein the angular configuration of the intermediate perimeter portion of the cord relative to an at least substantially vertical axis (e.g., the y-axis, as illustrated), may be at least substantially independent of the angular configuration of the module housing 110 relative to the at least substantially vertical axis. For example, as described in further detail herein, the intermediate perimeter portion of the cord extending away from the module housing 110 (e.g., via the cord retention element exit orifice 121 and through the cord passage orifice 111) and towards the computing device 20 may extend away from the module housing 110 in an at least substantially vertical direction independent of an angular configuration of the module housing based at least in part on one or more gravitational forces acting on the cord.

As illustrated in FIG. 2B, the module housing 110 may further comprise a microphone interface orifice 113 configured to receive at least a portion of a microphone and/or a microphone boom secured to a microphone such that the microphone may be operatively secured relative to the detachable audio module 100. For example, as described herein, the microphone interface orifice 113 may be configured to receive a proximal end of a microphone boom therein, so as to operatively connect the microphone to the module housing 110 of the detachable audio module 100. In various embodiments, the microphone interface orifice 113 may be configured to facilitate attachment of the microphone and/or microphone boom to the module housing 110 via a swivel joint, pivot joint, and/or the like, such that the microphone boom may anchored at a point, axis, and/or the like within the module housing 110 and rotated along the length of the microphone interface orifice 113 (e.g., upwards or downwards within a y-z plane, as shown) relative to the module housing 110. In various embodiments, the microphone interface orifice 113 and the cord passage orifice 111 may be arranged at opposing ends of the module housing 110 on opposite sides of a hinged axis 112a that defines, at least in part, the rotational motion of the detachable audio module 100 relative to the headband to which it is detachably coupled. For example as illustrated, the microphone interface orifice 113 may be positioned at a front portion of the module housing 110 and the cord passage orifice 111 may be positioned at a back portion of the module housing 110.

Figure 3A:
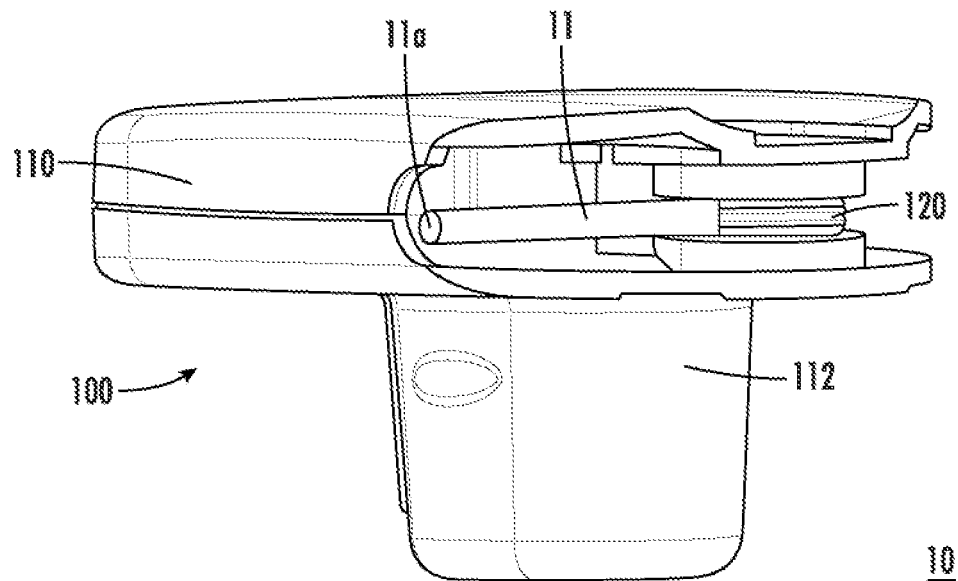
FIGS. 3A-3B illustrate various views of an exemplary modular headset assembly in accordance with various embodiments.
Figure 3B:
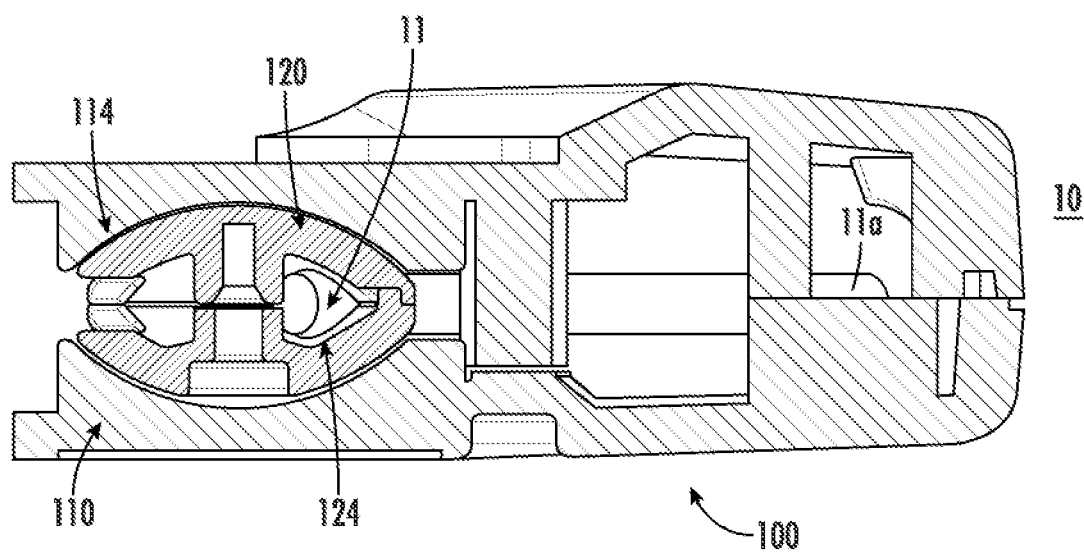

FIGS. 3A-3B illustrate various views of an exemplary modular headset assembly in accordance with various embodiments. In particular. FIGS. 3A and 3B illustrate cutaway and cross-sectional views, respectively, of an exemplary detachable audio module 100 operatively connected to a cord 11 configured to facilitate transmission of audio signals to and/or from a computing device such that the modular headset assembly 10 comprises a wired configuration defined by the cord 11 being fixedly connected to at least a portion of the detachable audio module 100.

As illustrated, an exemplary modular headset assembly 10 may comprise a wired configuration defined at least in part by a cord 11 that extends between the detachable audio module 100 and an exemplary computing device, as described herein. In various embodiments, at least a portion of the cord 11 defining the wired configuration of the modular headset assembly 10 may be received by the detachable audio module 100 within an internal portion of the module housing 110. For example, a proximal end 11a of the cord 11 may be secured within an interior portion of the module housing 110. In various embodiments, the proximal end 11a of the cord 11 may be operatively coupled to one or more communicative components (not shown) disposed within the internal portion of the module housing 110 of the detachable audio module 100.

As illustrated in FIG. 3B, an exemplary detachable audio module 100 may be configured such that at least a portion of the cord 11 disposed within the internal portion of the module housing 110 may be provided within an internal portion 124 of cord retention element 120 housed within the internal portion of the module housing 110. For example, in various embodiments, the detachable audio module 100 may be configured such that at least a portion of the cord 11 disposed within the internal portion of the module housing 110 extends through the cord retention element 120 within the internal portion of the module housing 110 before the cord 11 is directed out of the module housing (e.g., to a computing device). For example, the portion of the cord 11 disposed within the module housing 110 may extend from the rigidly secured proximal end 11a to the cord retention element 120, where it may further extend through a cord retention element receiving orifice of the cord retention element 120 so as to be received within the internal portion 124. As described in further detail herein, the detachable audio module 100 may be configured such that the cord retention element 120 is positioned within a socket 114 defined within the internal portion of the module housing 110, so as to embody a ball joint of a ball-in-socket connection configured to facilitate the extension of the cord 11 out from within the internal portion of the module housing 110 in a direction corresponding at least in part to a neutral position of the cord 11, as described herein. For example, the location along the exterior of the module housing from which the cord 11 extends out of the module housing 110 (e.g., an intermediate perimeter portion of the cord 11) may vary based at least in part on one or more relative rotational movements exhibited by the cord retention element 120 relative to the module housing 110, as enabled by the ball-in-socket connection described herein.

Figure 4A:
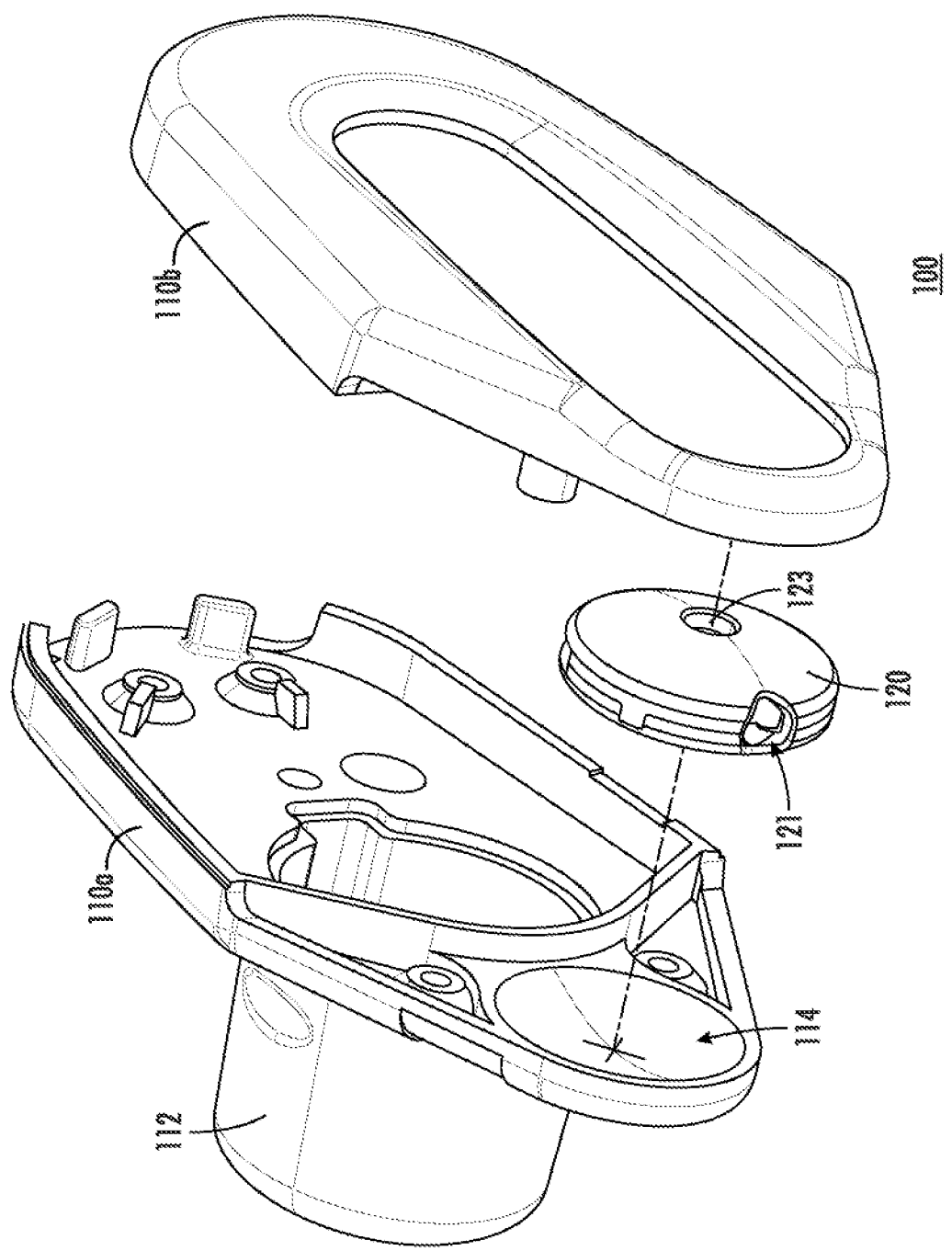

FIGS. 4A-4B illustrate various exploded views of an exemplary modular headset assembly in accordance with various embodiments. In particular, FIGS. 4A and 4B illustrate exploded views of an exemplary detachable audio module 100 comprising a module housing 110 configured to house a cord retention element 120 therein such that the cord retention element comprises a dynamic configuration defined at least in part by a ball-in-socket connection. As illustrated, the module housing 110 may comprise one or more internal surfaces arranged about the internal portion thereof that define a socket 114 within which the cord retention element 120 may be positioned. For example, the socket 114 defined within the module housing 110 may be configured based at least in part according to the configuration of the cord retention element 120, such as, for example, by having a corresponding shape, size, thickness, and/or the like such that a cord retention element 120 disposed within the socket 114 may at least substantially freely rotate about a central axis 123 thereof in order to enable the range of relative rotational motion between the cord retention element 120 and the module housing 110, as described herein. As described herein, the detachable audio module 100 may be configured such that the cord retention element 120 disposed within the socket 114 may embody a ball joint of a ball-in-socket connection configured to secure the linear position of the cord retention element 120 within the module housing 110 while enabling a range of relative rotational motion between the cord retention element 120 and the module housing 110. In such an exemplary configuration, the cord retention element 120 may comprise a dynamic configuration that is defined at least in part by the ball-in-socket connection and configured to enable the intermediate perimeter portion of the cord 11 extending outward from within the module housing 110 to extend in a direction corresponding at least in part to a neutral position of the cord 11 based on the ability of the cord retention element 120 to rotate within the module housing 110 at least partially independent of the housing 110, as described herein.

In various embodiments, as shown, the module housing 110 may comprise a first housing component 110a and a second housing component 110b configured to be assembled (e.g., coupled) together so as to collectively define the module housing 110 defining the internal portion therein. For example, in various embodiments, the first housing component 110a and the second housing component 110b may define respective lateral sides of the module housing 110 that may be coupled together along a plane that is at least substantially coplanar with the central axis of the cord passage orifice of the module housing, as described herein. In various embodiments, the socket 114 may be made up by a first socket surface defined by an internal surface of the first housing component 110a and a second socket surface defined by an internal surface of the second housing component 110, such that, upon assembly of the first and second housing components 110a, 110b, the socket 114 may comprise an internal volume that is at least substantially similar to the exterior profile of the cord retention element 120. Further, as illustrated in FIG. 4B, in various embodiments, the cord retention element 120 may comprise a first cord retention element component 120a and a second cord retention element component 120b configured to be assembled (e.g., coupled) together so as to collectively define the cord retention element 120 having the internal portion 124 defined therein. For example, in various embodiments, the first cord retention element component 120a and the second cord retention element component 120b may define respective lateral sides of the cord retention element 120 that may be coupled together along a plane that, when the cord retention element 120 is positioned within the socket 114 of the module housing 110, is at least substantially coplanar with the central axis of the cord passage orifice of the module housing 110, as described herein.

Figure 5C:
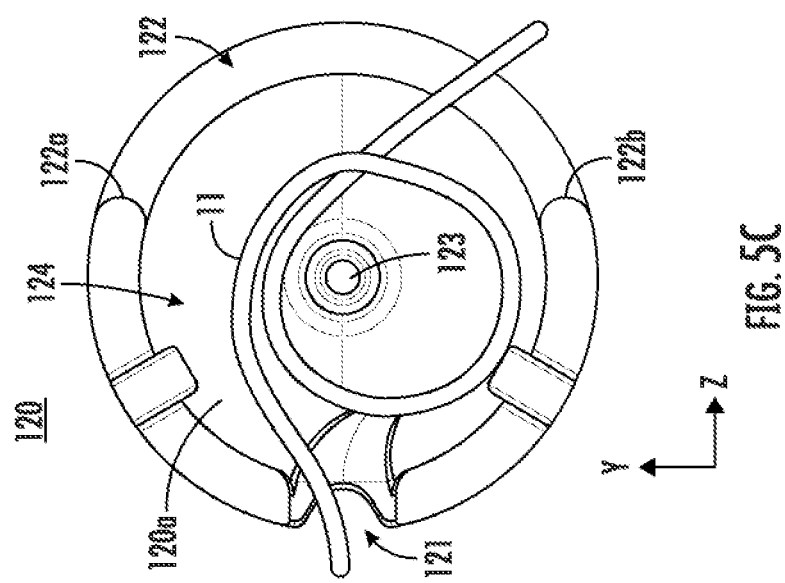
FIGS. 5A-5C illustrate various perspective views of certain components an exemplary modular headset assembly in accordance with various embodiments.
Figure 5B:
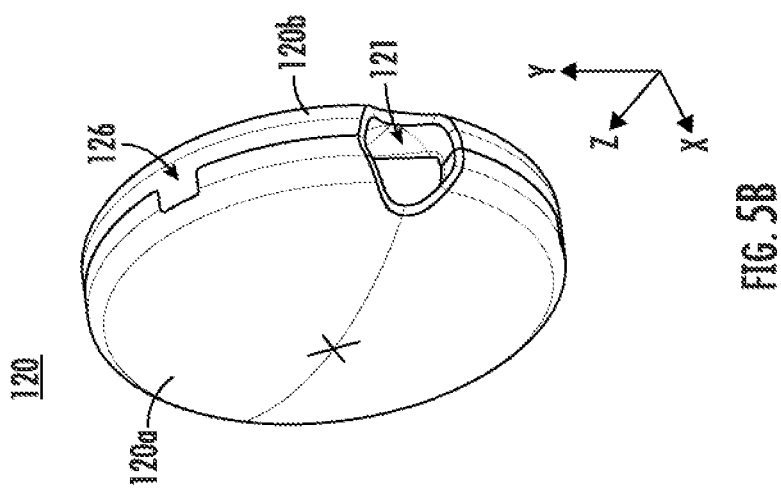
Figure 5A:
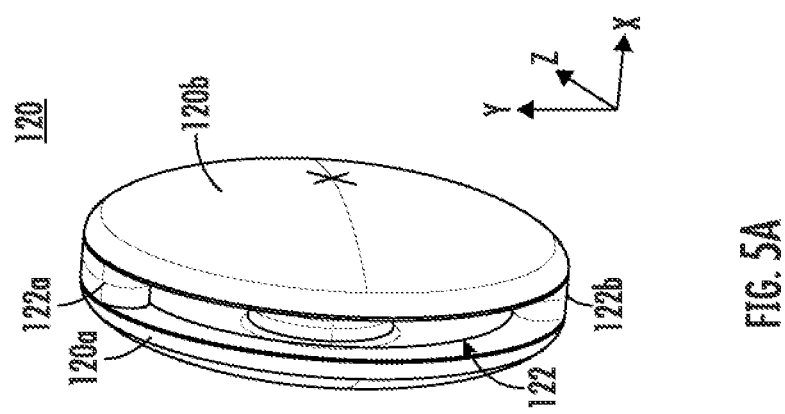

FIGS. 5A-5C illustrate various views of certain components an exemplary modular headset assembly in accordance with various embodiments. In particular, FIGS. 5A-5B and 5C illustrate various perspective views and a cross-sectional view, respectively, of an exemplary cord retention element 120 in accordance with various embodiments described herein. In various embodiments, the cord retention element 120 may comprise an exterior shell defining an interior portion 124 therein, within which the cord retention element 120 may receive a portion of a cord 11 that is connected at a proximal end to one or more communicative components within a module housing of an exemplary detachable audio module, the portion of the cord 11 received by the cord retention element 120 being at least a position of the length of the cord 11 disposed within an internal portion of the module housing.

In various embodiments, the cord retention element 120 disposed within the internal portion of the module housing, as described herein, may comprise a cord retention element receiving orifice 122 arranged so as to extend through the external shell of the cord retention element 120 to provide an opening connecting the internal portion of the module housing to the internal portion 124 of the cord retention element 120. The cord retention element receiving orifice 122 may be configured such that a cord that is operatively connected at a proximal end thereof to one or more communicative components disposed within the module housing may be received by the cord retention element 120 through the cord retention element receiving orifice 122. As illustrated in FIG. 5A, the cord retention element receiving orifice 122 may comprise an elongated opening (e.g., slot) defined at least in part by a length that extends along at least a portion of a perimeter sidewall 126 of the cord retention element 120. For example, the cord retention element receiving orifice 122 may extend along a perimeter sidewall 126 between a first receiving orifice end 122a and a second receiving orifice end 122b. In various embodiments, as the cord retention element 120 exhibits a relative rotational motion about a central axis thereof 123 with respect to the module housing of the detachable audio module, the portion of the cord 11 extending through the cord retention element receiving orifice 122 may be moved along the length of the cord retention element receiving orifice 122 between the first receiving orifice end 122a and the second receiving orifice end 122b of the cord retention element receiving orifice 122. In various embodiments, the length of the cord retention element receiving orifice 122 extending along the perimeter sidewall 126 between the first receiving orifice end 122a and the second receiving orifice end 122b may define an angle of at least substantially between 0 radians and $1.5\pi$ radians (e.g., between $0.5\pi$ radians and $\pi$ radians). For example, in various embodiments, the length of the cord retention element receiving orifice 122 may be based at least in part on the configuration of the service loop provided within the internal portion 124 of the cord retention element 120.

Further, in various embodiments, the cord retention element 120 may comprise a cord retention element exit orifice 121 extending through the external shell of the cord retention element 120 such that an exemplary cord received by the cord retention element 120 via the cord retention element receiving orifice 122 and disposed within the internal portion 124 of the cord retention element 120 may be provided through cord retention element exit orifice 121 so as to extend out of the cord retention element 120. As illustrated in FIG. 5B, the cord retention element exit orifice 121 may comprise an opening (e.g., a holt, aperture, and/or the like) that extends through the perimeter sidewall 126 and is defined at least in part by an orifice shape corresponding at least in part to a cross-sectional configuration of the cord disposed therein. For example, in various embodiments, the shape of the cord retention element exit orifice 121 may be at least substantially similar to the cross-sectional configuration of the cord disposed therein such that a force causing the portion of the cord disposed within the cord retention element exit orifice 121 to move in a rotational direction about the central axis 123 of the cord retention element 120 may be transmitted to the external shell of the cord retention element 120 such that the cord retention element 120 may exhibit a resultant rotational movement.

As illustrated, in various embodiments, the cord retention element exit orifice 121 and the cord retention element receiving orifice 122 may be arranged at opposing ends of the cord retention element 120 on opposite sides of a central rotational axis 123 that defines, at least in part, the rotational motion of the cord retention element 120 relative to the module housing within which the cord retention element 120 is disposed. For example as illustrated, the cord retention element 120 may be arranged within the internal portion of the module housing of the detachable audio module such that the cord retention element receiving orifice 122 is positioned in a front-facing direction facing a front portion of the module housing and the cord retention element exit orifice 121 is positioned to face in an at least substantially opposite rear-facing direction facing a rear portion of the module housing (e.g., at least substantially adjacent a cord passage orifice of the module housing).

FIG. 5C illustrates a cross-sectional view of an exemplary cord retention element 120, wherein an at least a portion of an exemplary cord 11 is disposed within an internal portion 124 of the cord retention element 120. As illustrated, the cord 11 extending through the cord retention element 120 may be received within the internal portion 124 via the cord retention element receiving orifice 122. The cord 11 may extend through the internal portion 124 of the cord retention element 120 and may extend outward therefrom (e.g., to exit the cord retention element 120) through the cord retention element exit orifice 121. As illustrated, the portion of the cord 11 disposed within the internal portion 124 of the cord retention element 120 may be configured so as to embody a service loop defined at least in part by a length of the cord disposed within the internal portion 124 that is sufficiently long so as to enable a full range of relative rotational motion between the module housing and the cord retention element 120, as described here, without the relative motion being limited by the portion of the cord 11 disposed within the module housing being fully extended prior to the cord retention element 120 being rotated through its full range of relative motion. For example, the illustrated portion of the cord 11 arranged in a service loop may be configured to accommodate the variable nature of the length of the cord 11 disposed within the module housing that results from the dynamic configuration of the cord retention element 120, as described herein. As shown, in various embodiments, a cord retention element 120 may comprise an internal rod, pin, bar, protrusion, and/or the like extending in a lateral direction (e.g., along the x-axis, as illustrated) along the central axis 123 between respective interior surfaces of a first side 120a and a second side 120b of the cord retention element 120. In an exemplary configuration, the portion of the cord 11 disposed within the internal portion 124 may be wrapped (e.g., looped) around the entirety of the perimeter of the central rod element disposed within the internal portion 124 such that the cord 11 defines a single loop that extends around the central rod element so as to define a service loop to facilitate the flexible configuration of the cord 11 relative to the module housing of the detachable audio module, as described herein. For example, in various embodiments, the service loop defined by the portion of the cable 11 within the internal portion 124 of the cord retention element 120 may be defined at least in part by an additional cord length that may be based on, for example, a diameter of the cord 11, a range of relative rotational motion of the cord retention element 120 relative to the module housing 110, a diameter of the cord retention element 120, a diameter of the central rod element, and/or the like. In various embodiments, an exemplary service loop within the cord retention element 120 may embody a full loop of the cord 11 around the central rod element extending through the internal portion 124 of the cord retention element 120. For example, in various embodiments, the configuration of the service loop provided within the internal portion 124 of the cord retention element 120 may be based at least in part on the length of the cord retention element receiving orifice 122.

FIGS. 6A-6B illustrate various perspective views of an exemplary modular headset assembly in accordance with various embodiments. In particular, FIGS. 6A and 6B illustrate perspective views of a detachable audio module 100 configured in an active position and a resting position, respectively. As described herein, in an exemplary circumstance wherein the detachable audio module 100 is attached to a headband, the module housing 110 of the detachable audio module 100 may be hingedly connected to the headband such that the detachable audio module 100 may be selectively configured between an active position and a resting position by rotating the module housing 110 about a hinge axis relative to the headband, the hinge axis being defined by the interface between the headband and the module interface element 112, as described herein. For example, in various embodiments, as illustrated in FIG. 6A, an active position of a detachable audio module 100 may be defined by a configuration wherein a microphone interface element 113 positioned about a front portion of the detachable audio module 100 is pointed in a direction at least substantially towards a mouth of a user wearing a headband. For example, in an exemplary orientation wherein a user wearing a modular headset assembly is standing in an upright position looking in a substantially forward direction (e.g., in the positive z-direction, as shown) along a horizontal plane (e.g., the z-x plane, as shown) towards a horizon, an active position of a detachable audio module 100 may be defined by a configuration wherein the length of the detachable audio module 100 defined between a front portion and a back portion of the detachable audio module 100 (e.g., along a central axis extending between the microphone interface element 113 and the cord passage orifice 111) extends along an at least substantially horizontal plane. detachable audio module 100

Further, in various embodiments, as illustrated in FIG. 6B, a resting position of a detachable audio module 100 may be defined by a configuration wherein the microphone interface element 113 positioned about a front portion of the detachable audio module 100 is pointed in a direction at least substantially away from the mouth of the user wearing a headband, such as, for example, in an at least partially vertical direction (e.g., along the y-axis). For example, in the aforementioned exemplary orientation wherein a user wearing the modular headset assembly is standing in an upright position looking in a substantially forward direction (e.g., in the positive z-direction, as shown) along a horizontal plane (e.g., the z-x plane, as shown) towards a horizon, a resting position of the detachable audio module 100 may be defined by a configuration wherein the length of the detachable audio module 100 defined between the front portion and the back portion of the detachable audio module 100 (e.g., along a central axis extending between the microphone interface element 113 and the cord passage orifice 111) extends in a direction defined at least in part by a vertical component, such as, for example, in a direction at along a y-axis.

For example, the resting position may be defined by a position wherein the detachable audio module 100 (e.g., a front portion of the detachable audio module 100) is flipped (e.g., rotated) upwards, while the active position may be defined by a position wherein the detachable audio module 100 (e.g., the front portion of the detachable audio module 100) is flipped (e.g., rotated) downwards, as described herein. In such an exemplary configuration, as illustrated in FIGS. 6A and 6B, a reconfiguration of the detachable audio module 100 between the active position and the resting position may cause a rear portion of the module housing 110, including the cord passage orifice 111 to exhibit a corresponding rotation about the hinge axis defined by the module interface element 112. As described herein, and as obviated by a comparison of the exemplary embodiments illustrated in FIGS. 6A and 6B, such a rotation of the module housing 110 may result in a change in the angular configuration of the rear portion of the module housing 110 (e.g., the cord passage orifice 111) relative to one or both of the exemplary headband secured to the detachable audio module 100 and a vertical axis extending perpendicular to a ground surface (e.g., towards the center of the Earth).

In various embodiments, as described in further detail herein in reference to FIGS. 7A and 7B, the cord retention element 120 disposed within module housing 110 at least substantially adjacent a portion of the cord passage orifice 111 disposed at the rear portion of the housing 110 may comprise a dynamic configuration relative to the module housing 110 such that the detachable audio module 100 (e.g., the module housing 110) may rotate between the active position and the resting position so as to change the angular configuration of the rear portion of the module housing 110 (e.g., the cord passage orifice 111) relative to, for example, a vertical axis (e.g., the y-axis, as illustrated) perpendicular to a ground surface, without causing the angular configuration of the cord retention element 120 (e.g., the cord retention element exit orifice 121) relative to the vertical axis perpendicular to the ground surface to change. For example, the cord retention element 120 may define a range of relative rotational motion relative to the module housing 110 such that the angular configuration of the cord retention element exit orifice 121 relative to a vertical axis perpendicular to a ground surface (e.g., as measured along the y-z plane, as shown) may remain at least substantially the same throughout a rotation of the module housing 110 between an active position and a resting position. In various embodiments, wherein a portion of a cord disposed within the module housing 110 is positioned within the cord retention element 120 such that the intermediate perimeter portion of the cord extends out from the cord retention element exit orifice 121, through the cord passage orifice 111 and away from the module housing 110 towards a computing device, the intermediate perimeter portion of the cord may, based at least in part on one or more gravitational forces acting on the cord, extend away from the module housing 110 in an at least substantially downward vertical direction (e.g., in a negative y-direction) regardless of the angular configuration of the module housing 110.

As illustrated by the exemplary embodiments shown in FIGS. 6A and 6B, in various embodiments, the range of relative rotational motion between the module housing 110 and the cord retention element 120 disposed therein may be defined within an y-z plane, as shown, that may intersect the cord passage orifice 111 such that the cord retention element exit orifice 121 may rotate along the length of the cord passage orifice 111 as the module housing 110 rotates relative to the cord retention element 120. As described herein, the cord passage orifice 111 may be defined by a length that extends along a perimeter surface of the module housing 110 between a first orifice end 111a and a second orifice end 111b. In various embodiments, the cord passage orifice 111 may have a length that is sufficiently large so as to enable the cord retention element 120 disposed within the module housing 110 to rotate through its full range of relative rotational motion, as described herein. For example, in various embodiments, the cord retention element 120 (e.g., the cord retention element exit orifice 121 may define a range of relative rotational motion with respect to the module housing 110 such that the intermediate perimeter portion of the cord extending through the cord retention element exit orifice 121 may move between the first orifice end 111a and the second orifice end 111b of the cord passage orifice 111, wherein the range of relative rotational motion is at least substantially between π radians and 1.75π radians (e.g., between 1.25π radians and 1.5π radians).

For example, as the module housing 110 is rotated relative to the cord retention element 120, the range of relative rotational motion between the cord retention element 120 and the module housing may be restricted based at least in part by the intermediate perimeter portion of the cord extending from the cord retention element exit orifice 121 being physically contained between the first and second orifice ends of the cord passage orifice 111, as described herein. For example, the range of relative rotational motion between the cord retention element 120 and the module housing 110 may be defined at least in part by a range of motion of an intermediate perimeter portion of the cord along a length of the cord passage orifice 111 between a first orifice end and a second orifice end. As described herein, the non-rigid angular configuration of the intermediate perimeter portion of the cord extending from the cord retention element exit orifice 121 relative to the hinge axis of the module housing 110, defined at least in part by the range of relative rotational motion between the module housing the cord retention element 120, facilitates a modular headset assembly wherein the mechanical strain realized at the connection point between the cord and the modular headset assembly is at least substantially minimized by eliminating at least a portion of the forces acting on the cord and/or the modular headset assembly as a result of the cord experiencing tension in a direction that is not at least substantially congruent with the angular configuration of the portion of the headset assembly to which the cord is connected.

FIGS. 7A-7B illustrate various cross-sectional views of an exemplary modular headset assembly in accordance with various embodiments. In particular, FIGS. 7A and 7B illustrate cross-section views of an exemplary modular headset assembly 10 wherein the detachable audio module 100 is operatively connected to the headband 200, as described herein, wherein the detachable audio module 100 configured in an active position and a resting position, respectively. As described herein, the detachable audio module 100 may attached to a headband 200 via a hinged connection between a module interface element 112 defined along an exterior of the module housing 110 of the detachable audio module 100 and an end portion of the headband 200. As shown in FIGS. 7A and 7B, the detachable audio module 100 may be selectively configured between an active position and a resting position by rotating the module housing 110 about a hinge axis relative to the headband 200, the hinge axis being defined by central axis of the module interface element 112, as described herein.

FIG. 7A illustrates an exemplary modular headset assembly 10 wherein the detachable audio module 100 is configured in an active position upon having been rotated in a first rotational direction 411 about the hinge axis defined by the central axis of the module interface element 112 (e.g., a clockwise direction, as illustrated). As described herein, as the detachable audio module 100 rotates in the first rotational direction 411 about the hinge axis defined by the central axis of the module interface element 112, the ball-in-socket configuration of the cord retention element 120 within the module housing 110 may enable a range of relative rotational motion between the cord retention element 120 and the module housing 110, such that the cord retention element 120 may effectively exhibit a rotational movement relative to the module housing 110 in a second rotational direction 412 about the central axis 123 of the cord retention element 120. For example, a dynamic configuration of the cord retention element 120 with respect to the module housing 110 may be defined at least in part by a ball-in-socket arrangement configured to at least substantially minimize the frictional forces between the exterior surfaces of the cord retention element 120 and the interior surfaces of the module housing 110 adjacent thereto, such that, in an exemplary circumstance wherein the angular configuration of the module housing 110 changes relative to, for example, a vertical axis (e.g., the y-axis, as illustrated) perpendicular to a ground surface, the cord retention element 120 may freely rotate about the central axis 123 thereof relative to the module housing 110.

In various embodiments, the cord retention element 120 may be configured to facilitate a relative rotational motion with respect to the module housing 110 in the second rotational direction 412 such that the cord retention element 120 is able maintain to an at least substantially neutral position within the module housing 110 as the housing 110 is rotated in the first rotational direction 411. As described herein, a neutral position of an exemplary cord retention element 120 may be defined by a stable position assumed by the cord retention element 120 wherein the mechanical strain realized by the intermediate perimeter portion of the cord extending through the cord retention element exit orifice 121 is at least substantially minimized. For example, as illustrated in FIG. 7A, the neutral position of the cord retention element 120 may be defined by a stable position in which the intermediate perimeter portion of the cord 11 extending through the cord retention element exit orifice 121 extends (e.g., hangs) away from the module housing 110 in a gravitational direction 401 (e.g., in an at least substantially downward vertical direction such as the negative y-direction) as a result of a minimized tension in the cord 11 and one or more gravitational forces acting thereon.

FIG. 7B illustrates an exemplary modular headset assembly 10 wherein the detachable audio module 100 is configured in resting position upon having been rotated in a third rotational direction 421 about the hinge axis defined by the central axis of the module interface element 112 (e.g., a counterclockwise direction, as illustrated). As described herein, as the detachable audio module 100 rotates in the third rotational direction 421 about the hinge axis defined by the central axis of the module interface element 112, the ball-in-socket configuration of the cord retention element 120 within the module housing 110 may enable a range of relative rotational motion between the cord retention element 120 and the module housing 110, such that the cord retention element 120 may effectively exhibit a rotational movement relative to the module housing 110 in a fourth rotational direction 422 about the central axis 123 of the cord retention element 120.

As described herein, the cord retention element 120 may facilitate a relative rotational motion with respect to the module housing 110 in the fourth rotational direction 422 such that the cord retention element 120 is able to remain in an at least substantially neutral position within the module housing 110 as the housing 110 is rotated in the third rotational direction 421. For example, as illustrated in FIG. 7B, the cord retention element 120 is shown in a neutral position defined by a stable position in which the intermediate perimeter portion of the cord 11 extending through the cord retention element exit orifice 121 extends (e.g., hangs) away from the module housing 110 in a gravitational direction 402 (e.g., in an at least substantially downward vertical direction such as the negative y-direction) as a result of a minimized tension in the cord 11 and one or more gravitational forces acting thereon. As described herein, and as obviated by a comparison of the exemplary embodiments illustrated in FIGS. 7A and 7B, as the angular configuration of the module housing 110 changes relative to a vertical axis perpendicular to a ground surface (e.g., towards the center of the Earth, along the y-axis, as illustrated), the cord retention element 120 may be configured to maintain an at least substantially neutral position by rotating relative to the module housing 110 about the central axis 123. In such an exemplary circumstance wherein the cord retention element 120 exhibits an at least substantially negligible rotational motion about the central axis 123 as the module housing 111 is rotated in either a first rotational direction 411 or a third rotational direction 421, the intermediate perimeter portion of the cord extending through the cord retention element exit orifice 121 of the cord retention element 120 may be moved within cord passage orifice 111 of the module housing 110, such as, for example, from a first radial position, along the length of the cord passage orifice 111 in a direction corresponding to the relative rotational motion in the second or fourth rotational directions 412, 422, respectively, to a second radial position. For example, in various embodiments, the Although various embodiments provided herein are described with respect to a detachable audio module comprising a cord retention element comprising a dynamic configuration with respect to the module housing of the detachable audio module such that the cord retention element (e.g., the intermediate perimeter portion of the cord extending therefrom) is able maintain to an at least substantially neutral position within the module housing as the module housing is rotated between an active position and a resting position, it should be understood that such a dynamic configuration may be applicable to enable a range of relative rotational motion between the cord retention element and the module housing in any circumstance wherein the angular configuration of the module housing changes relative to a vertical axis perpendicular to a ground surface (e.g., towards the center of the Earth). For example, Such an exemplary configuration may facilitate the functionality of the present invention described herein in exemplary circumstances wherein the detachable audio module 100 is reconfigured (e.g., rotated) relative to a headband to which it is attached, wherein the head of a user wearing the modular headset assembly is moved such that the position of the modular headset assembly (e.g., the detachable audio module) is reoriented within an environment, and/or the like.

Figure 8B:
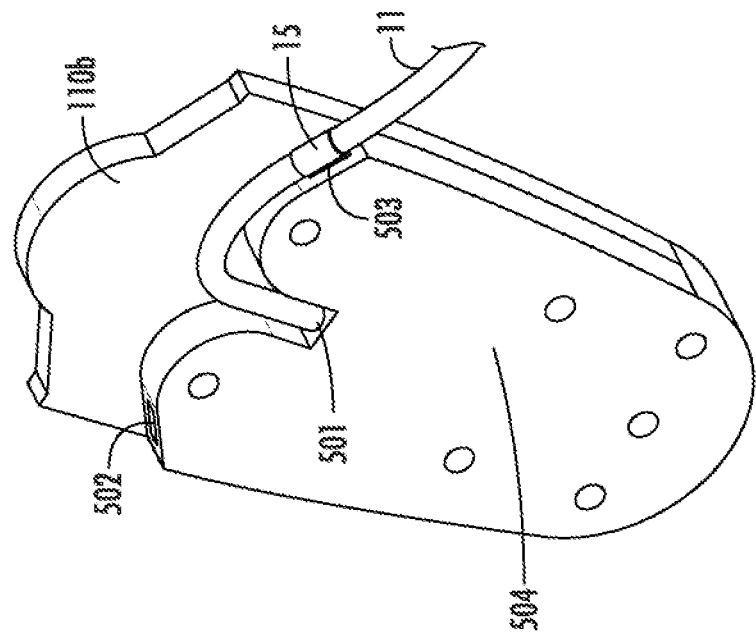
FIGS. 8A-8B illustrate various perspective views of certain components of an exemplary modular headset assembly in accordance with various embodiments.
Figure 8A:
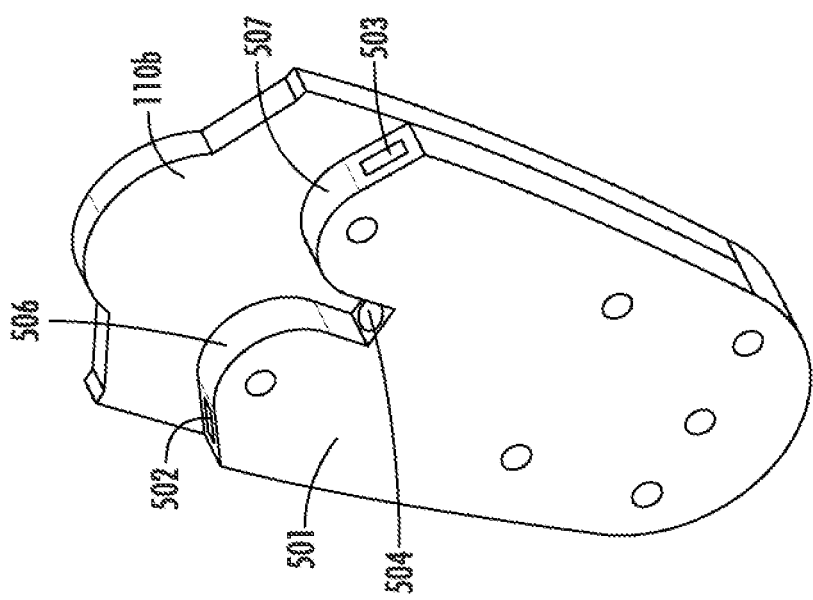

FIGS. 8A-8B illustrate various perspective views of certain components of an exemplary modular headset assembly in accordance with various embodiments. In particular, FIG. 8A illustrates an exemplary embodiment wherein a detachable audio module comprises a module housing component 110b having a cord retention element 501 configured to enable a cord fixedly secured at a proximal end within the internal portion of a module housing to extend out from the module housing of the detachable audio module in one of a plurality of directions based at least in part on the angular configuration of the module housing relative to a vertical axis extending in a gravitational direction (e.g., towards the center of the Earth). In various embodiments, the cord retention element 501 may comprise a material thickness configured to be secured relative to one or more interior surfaces of a module housing, such as for example, a housing component 110b of the module housing. For example, as illustrated, the cord retention element 501 may be configured to receive at least a portion of a cord disposed within the internal portion of the housing such that the cord extends through a cord retention element exit orifice 504 arranged at least substantially adjacent one or more internal surfaces 506, 507 configured to define a range of motion of the portion of the cord extending from the cord retention element exit orifice 504 within the module housing. As illustrated, the one or more internal surfaces 506, 507 may comprise respective curved surfaces having a flared configuration in a radially outward direction away from the cord retention element exit orifice 504. As described herein, the one or more internal surfaces 506, 507 may be configured to extend the at least partially between a location adjacent the cord retention element exit orifice 504 and a respective end portion orifice end of a cord passage orifice of the module housing, such that the one or more internal surfaces 506, 507 are configured to define the angular range of motion of the portion of the cord extending from the cord retention element exit orifice 504 between a first orifice end and a second orifice end of a cord passage orifice defined along an exterior of the module housing, as described herein.

As such, the cord retention element 501 is configured to facilitate the direction of a cord (e.g., an intermediate perimeter portion of the cord) connected within a detachable audio module out from within the module housing towards a computing device in direction corresponding to a neutral position of the cord, wherein the intermediate perimeter portion of the cord extending through the cord passage orifice of the module housing extends (e.g., hangs) away from the exterior of the module housing in a gravitational direction (e.g., in an at least substantially downward vertical direction) as a result of a minimized tension in the cord and one or more gravitational forces acting thereon.

Further, as illustrated, the cord retention element 501 may comprise one or more temporary fastening elements 502, 503, such as, for example, magnets, disposed along a portion of the respective one of the internal surfaces 506, 507 at least substantially adjacent one of the first orifice end and the second orifice end of the cord passage orifice. In such an exemplary configuration, a temporary fastening element 502, 503 may define a temporary means of at least partially anchoring a portion of the cord disposed within the internal portion of the module housing at a position at least substantially adjacent an orifice end of the cord passage orifice. For example, the one or more temporary fastening means 502, 503 may be configured to at least partially stabilize the cord (e.g., the intermediate perimeter portion of the cord) in one or more predefined angular configurations based at least in part on the position of the one or more temporary fastening means 502, 503. As illustrated in FIG. 8B, a corresponding temporary fastening means 15 configured to facilitate a temporary connection with the temporary fastening means 502, 503 may be secured to a portion of the cord 11 disposed within an internal portion of the module housing. For example, a corresponding fastening means 15 may be position along a length of the cord 11 in between the cord retention element exit orifice 504 and the cord passage orifice of the module housing, such that the corresponding fastening means 15 may be secured to one of the temporary fastening means 502, 503 via a temporary physical connection. In such an exemplary circumstance, as illustrated in 8B, the portion of the cord 11 to which the corresponding fastening means 15 is attached may be temporarily anchored adjacent one of the temporary fastening means 502, 503 so as to at least temporarily stabilize the angular configuration of the intermediate perimeter portion of the cord 11 extending through the cord passage orifice in a position adjacent an orifice end thereof.

Figure 9B:
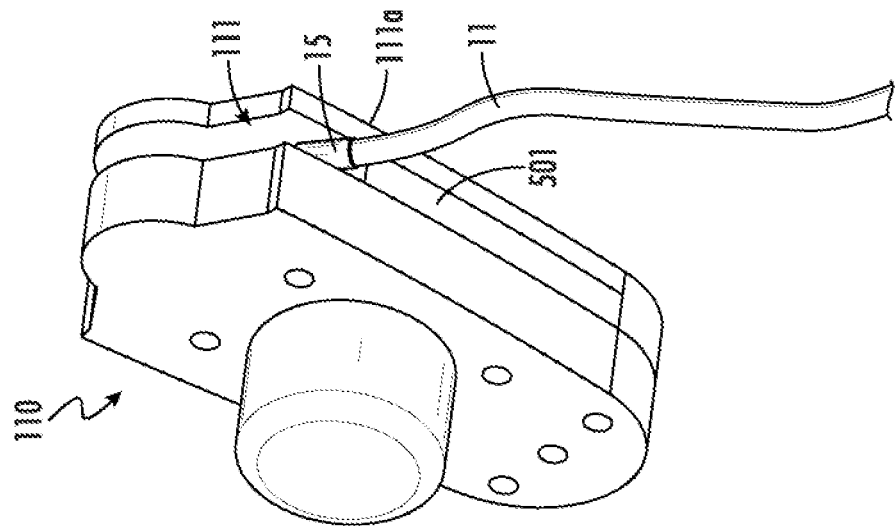
FIGS. 9A-9B illustrate various perspective views of an exemplary modular headset assembly in accordance with various embodiments.
Figure 9A:
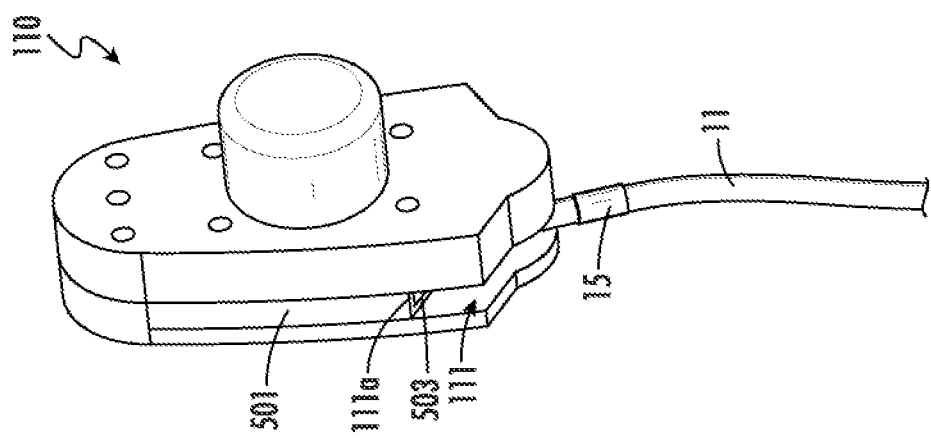

FIGS. 9A-9B illustrate various perspective views of an exemplary modular headset assembly in accordance with various embodiments. In particular, FIG. 9A illustrates an exemplary modular headset assembly wherein the detachable audio module 100 is configured in a resting position defined by the module housing 110 being arranged an at least substantially vertical configuration wherein the front portion of the module housing 110, as described herein, is facing an at least substantially upwards vertical direction. As described herein, the cord retention element 501 is configured to facilitate the direction intermediate perimeter portion of the cord 11 out from within the module housing 110 in direction defined by the neutral position of the cord 11. Based at least in part on the substantially vertical configuration of the module housing 110 of the detachable audio module 100, the intermediate perimeter portion of the cord 11 may extend (e.g., hang) away from the module housing 110 in a gravitational direction (e.g., in an at least substantially downward vertical direction) based at least in part on one or more gravitation forces acting on the cord 11. In such an exemplary circumstance, the corresponding fastener element 15 secured to the cord 11 may remain detached from the one or more temporary fastening elements 503, as the cord 11 does not extend through the cord passage orifice 111 adjacent an orifice end 111a thereof.

In the exemplary embodiment illustrated in FIG. 9B, an exemplary modular headset assembly comprises a detachable audio module 100 configured in an active position defined by the module housing 110 being arranged in at least substantially horizontal configuration wherein the front portion of the module housing 110, as described herein, faces a direction at least substantially perpendicular to the gravitational direction, as described herein. Based at least in part on the substantially horizontal configuration of the module housing 110 of the detachable audio module 100, the intermediate perimeter portion of the cord 11 may extend through the cord passage orifice 111 at a location at least substantially adjacent an orifice end 111a thereof. For example, the intermediate perimeter portion of the cord 11 may extend (e.g., hang) away from the module housing 110 in a gravitational direction (e.g., in an at least substantially downward vertical direction) based at least in part on one or more gravitation forces acting on the cord 11. In such an exemplary circumstance, the corresponding fastener element 15 secured to the cord 11 may engage a temporary fastening element 503 provided within the cord retention element 501 such that the corresponding fastening element 15 (e.g., the portion of the cord 11 to which the fastening element 15 is secured) is at least temporarily (e.g., removably) anchored within the internal portion of the module housing 110 at a position at least substantially adjacent an orifice end 11a of the cord passage orifice 111. In various embodiments, the corresponding fastening element 15 may be positioned along the cord 11 at a position such that, when the corresponding fastening element 15 is engaged with a temporary fastening means, the length of the portion of the cord between the cord retention element exit orifice 504 and the corresponding fastening element 15 comprises an amount of slack sufficient to at least substantially minimize the amount of tension in the cord 11 between the cord retention element exit orifice 504 and the corresponding fastening element 15, so as to at least substantially reduce the mechanical strain realized at the intermediate perimeter portion of the cord 11, as described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A modular headset assembly comprising:
   a headband configured to be worn on a head of a user;
   a detachable audio module configured for electronic communication with a computing device via a wired communication defined at least in part by a cord coupled to the detachable audio module, the detachable audio module comprising:
     a module housing configured to house one or more communicative components within an interior portion defined therein;
     a cord retention element disposed within the interior portion of the module housing and comprising an at least partially dynamic configuration relative to the module housing defined at least in part by a range of relative rotational motion between the cord retention element and the module housing, wherein the cord retention element rotates within the module housing at least partially independently of an angular configuration of the module housing; and
     a module interface element comprising a protrusion extending away from an exterior of the module housing, wherein the headband is configured to receive the module interface element to secure the detachable audio module relative to the headband in one or more directions.

2. The modular headset assembly of claim 1, wherein the cord retention element is at least partially secured within the module housing via a ball-in-socket connection configured to secure a linear position of the cord retention element within the module housing and enable a rotational movement of the cord retention element relative to the module housing within the range of relative rotational motion.

3. The modular headset assembly of claim 2, wherein the module housing comprises a first housing component and a second socket surface, wherein the first housing component comprises first socket surface, wherein the second housing component comprises second socket surface, wherein the first housing component and the second housing component are configured to be coupled together such that the first socket surface and the second socket surface collectively define a socket configured to receive the cord retention element therein.

4. The modular headset assembly of claim 2, wherein the range of relative rotational motion between the cord retention element and the module housing is defined within a plane that extends along a length of the detachable audio module.

5. The modular headset assembly of claim 1, wherein at least a portion of the cord engaged with the cord retention element is disposed within an internal portion of the cord retention element, and wherein the at least a portion of the cord disposed within the internal portion of the cord retention element embodies a service loop.

6. The modular headset assembly of claim 1, wherein the detachable audio module is configured to rotate about a first central axis defined at least in part by the module interface element used to detachably secure the detachable audio module to the headband, such that the detachable audio module is selectively configurable between a plurality of angular configurations relative to the headband.

7. The modular headset assembly of claim 1, wherein the cord extends directly between a proximal end fixedly secured within the module housing and a distal end configured for coupling to the computing device.

8. The modular headset assembly of claim 1, wherein the detachable audio module comprises one or more temporary fastening elements configured engage at least a portion of the cord so as to at least partially stabilize the at least a portion of the cord in a predefined position within the module housing at least substantially adjacent a cord passage orifice extending along a perimeter of the module housing.

9. The modular headset assembly of claim 1, wherein a microphone is operatively connected to the detachable audio module.

10. The modular headset assembly of claim 1, wherein the range of relative rotational motion between the cord retention element and the module housing is configured such that an intermediate perimeter portion of the cord extending out from within an internal portion of the module housing is maintained in an at least substantially neutral position, wherein the intermediate perimeter portion extends away from the module housing in a gravitational direction based at least in part on one or more gravitational forces.

11. The modular headset assembly of claim 1, wherein the range of relative rotational motion between the cord retention element and the module housing is defined at least in part by a range of motion of an intermediate perimeter portion of the cord along a length of a cord passage orifice between a first orifice end and a second orifice end.

12. The modular headset assembly of claim 1, wherein the cord retention element comprises a cord retention element receiving orifice comprising an elongated opening extending radially along an outer perimeter of the cord retention element, and a cord retention element exit orifice comprising an at least substantially cylindrical aperture.

13. A modular headset assembly comprising:
   a headband configured to be worn on a head of a user;
   a detachable audio module in electronic communication with a computing device via a wired communication defined at least in part by a cord coupled to the detachable audio module, the detachable audio module comprising:
      a cord retention element configured to facilitate a dynamic configuration of a portion of the cord relative to a module housing such that an intermediate perimeter portion of the cord extending out from within the module housing defines an angular configuration relative to a gravitational direction that is at least partially independent of an arrangement of the module housing relative to the gravitational direction, and wherein the cord retention element rotates within the module housing at least partially independently of the angular configuration of the module housing; and
      a module interface element comprising a protrusion extending away from an exterior of the module housing, wherein the headband is configured to receive the module interface element to secure the detachable audio module relative to the headband in one or more directions.

14. The modular headset assembly of claim 13, wherein the detachable audio module comprises one or more temporary fastening elements configured engage at least a portion of the cord so as to at least partially stabilize the at least a portion of the cord in a predefined position within the module housing at least substantially adjacent a cord passage orifice extending along a perimeter of the module housing.

15. The modular headset assembly of claim 14, wherein the one or more temporary fastening elements comprise:
   a first temporary fastening element positioned within an internal portion of the module housing at least substantially adjacent a first orifice end of the cord passage orifice; and
   a second temporary fastening element positioned within the internal portion of the module housing at least substantially adjacent a second orifice end of the cord passage orifice;
   wherein the first orifice end and the second orifice end comprise opposing ends of the cord passage orifice with a length of the cord passage orifice extending therebetween.

16. The modular headset assembly of claim 14, wherein the one or more temporary fastening elements comprise a magnet, and wherein the cord comprises an at least partially magnetic section positioned along a length of the cord, wherein the at least partially magnetic section of the cord is configured to at least temporarily engage the magnet based at least in part on the dynamic configuration of the portion of the cord disposed within the module housing.

17. The modular headset assembly of claim 13, wherein the module housing comprises a first housing comprising and a second housing component, wherein the first housing component comprises a first socket surface, wherein the second housing component comprises a second socket surface, wherein the first housing component and the second housing component are configured to be coupled together such that the first socket surface and the second socket surface collectively define a socket configured to receive the cord retention element therein.

18. The modular headset assembly of claim 13, wherein the cord extends directly between a proximal end fixedly secured within the module housing and a distal end configured for coupling to the computing device.

19. The modular headset assembly of claim 13, wherein the detachable audio module is configured to rotate about a first central axis defined at least in part by the module interface element used to detachably secure the detachable audio module to the headband, such that the detachable audio module is selectively configurable between a plurality of angular configurations relative to the headband.

20. The modular headset assembly of claim 13, wherein the cord retention element comprises a plurality of curved surfaces arranged within an internal portion of the module housing and extending at least partially between a cord retention element exit orifice and an orifice end of a cord passage orifice extending along a perimeter of the module housing.

* * * * *